United States Patent
Yaroshenko et al.

(10) Patent No.: US 12,169,413 B2
(45) Date of Patent: Dec. 17, 2024

(54) AUTONOMOUS SCOUTING USING UNMANNED AERIAL VEHICLE

(71) Applicant: Deere & Company, Moline, IL (US)

(72) Inventors: Sergey Yaroshenko, Newark, CA (US); Cameron Cruz, San Francisco, CA (US)

(73) Assignee: DEERE &COMPANY, Moline, IL (US)

( * ) Notice: Subject to any disclaimer, the term of this patent is extended or adjusted under 35 U.S.C. 154(b) by 139 days.

(21) Appl. No.: 18/064,079

(22) Filed: Dec. 9, 2022

(65) Prior Publication Data

US 2024/0192693 A1    Jun. 13, 2024

(51) Int. Cl.
*G05D 1/00*      (2024.01)
*B64U 20/87*     (2023.01)
(Continued)

(52) U.S. Cl.
CPC .............. *G05D 1/101* (2013.01); *B64U 20/87* (2023.01); *B64U 50/30* (2023.01);
(Continued)

(58) Field of Classification Search
CPC ........ G05D 1/101; B64U 20/87; B64U 50/30; B64U 2101/30; B64U 2101/40;
(Continued)

(56) References Cited

U.S. PATENT DOCUMENTS

2016/0133039 A1* 5/2016 Ritter .................... G06T 3/4038
                                                        345/629
2017/0334559 A1* 11/2017 Bouffard .............. G08G 5/0034
(Continued)

OTHER PUBLICATIONS

Vasisht et al., "FarmBeats: An IoT Platform for Data-Driven Agriculture" Proceedings of the 14th USENIX Symposium on Networked Systems Design and Implementation (NSDI '17). Retrieved from https://www.usenix.org/conference/nsdi17/technical-sessions/presentation/vasisht. 17 pages, dated Mar. 2017.
(Continued)

*Primary Examiner* — Kenneth J Malkowski
(74) *Attorney, Agent, or Firm* — Hanley, Flight & Zimmerman, LLC

(57) ABSTRACT

Implementations are described for improving accuracy and efficiency in anomaly detection during autonomous scouting of crop fields. A method is provided and includes: operating an unmanned aerial vehicle (UAV) to fly along an initial flight path above a field, where the UAV collect images for the field and an edge-computing device disposed on (or included in) the UAV processes the images using a coarse-grained machine learning (ML) model to determine whether target region(s) are detected within the field. A reversed flight path can be determined based on the detected target region(s), and the UAV can fly along the reversed flight path from a point corresponding to an ending point of the initial flight path, to collect target images particularly for the detected target region(s). The collected target images can be processed using a fine-grained ML model, to more fully characterize the detected target region(s).

20 Claims, 18 Drawing Sheets

(51) Int. Cl.
*B64U 50/30* (2023.01)
*B64U 101/30* (2023.01)
*B64U 101/40* (2023.01)

(52) U.S. Cl.
CPC ...... *B64U 2101/30* (2023.01); *B64U 2101/40* (2023.01); *B64U 2201/10* (2023.01)

(58) Field of Classification Search
CPC .. B64U 2201/10; G06V 20/17; G06V 20/188; G06T 2207/10032; G01C 21/3852
See application file for complete search history.

(56) References Cited

U.S. PATENT DOCUMENTS

| 2020/0253127 | A1* | 8/2020 | McCall | G06Q 50/02 |
|---|---|---|---|---|
| 2022/0129673 | A1* | 4/2022 | Yaroshenko | G06V 20/188 |
| 2023/0135631 | A1* | 5/2023 | Faers | B64U 10/80 |
| | | | | 701/3 |

OTHER PUBLICATIONS

Yang et al., "Adaptive autonomous UAV scouting for rice lodging assessment using edge computing with deep learning EDANet" Computers and Electronics in Agriculture 179. 13 pages, dated 2020.

* cited by examiner front view

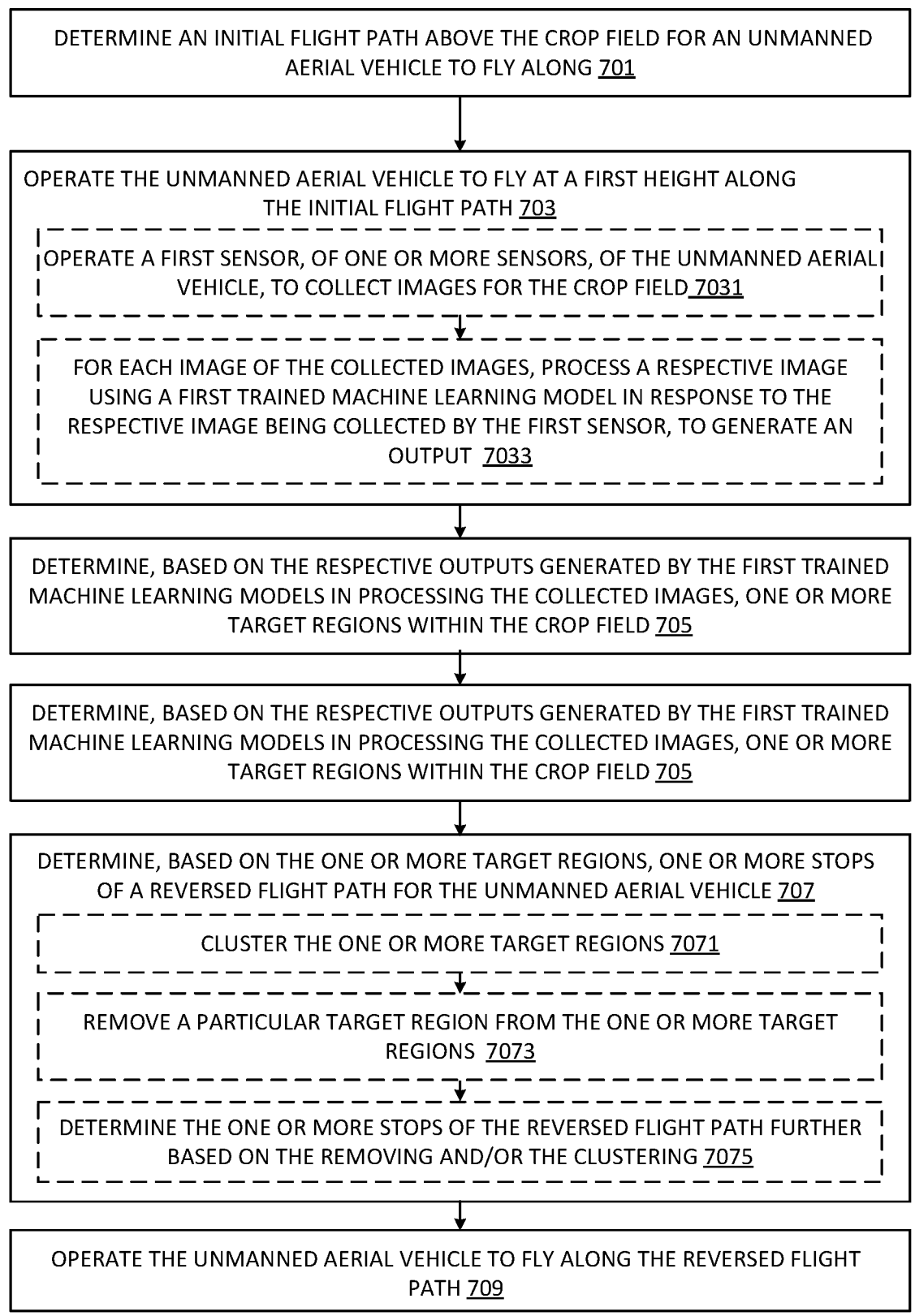

AUTONOMOUS SCOUTING USING UNMANNED AERIAL VEHICLE

BACKGROUND

Scouting, when applied to agricultural fields, is often known as crop scouting or field scouting, which can play an important role in assessing the health of crops, the growth of weeds, pest disease, or abiotic stresses that are not caused by pests. For a comprehensive and high-quality crop scouting of an agricultural field, frequent stops throughout an agricultural field are often needed for observation of the crops that are growing in the agricultural field. However, limited by time and resources such as labor, farmers or agricultural researchers often perform manual crop scouting by walking along a sampling path that consists of selected sampling stops, which bears relatively high risks of: missing stops for areas at issue, the failure to timely detect issues, and misdiagnosis. To reduce the aforementioned risks and to make informed decisions or treatment plans, there is a need in obtaining an accurate, comprehensive, and timely observation of the agricultural fields via autonomous crop scouting.

SUMMARY

Implementations are described herein for autonomous scouting of a field (e.g., crop field) using an unmanned aerial vehicle ("UAV", may also be referred to as a "drone", etc.), and via edge computing carried out at the unmanned aerial vehicle (in contrast to cloud computing carried out at one or more servers). In various implementations, given a field, an initial flight path of an unmanned aerial vehicle is determined for the unmanned aerial vehicle to fly over the field, where the initial flight path includes a starting point at which the unmanned aerial vehicle takes off from the field and an ending point at which the unmanned aerial vehicle lands on the field or start a reversed flight path. The unmanned aerial vehicle can, for example, land on the field at approximately the ending point of the initial flight path, to recharge/replace a battery that powers the unmanned aerial vehicle. Alternatively, depending at least on a remaining life of the battery that powers the unmanned aerial vehicle, the unmanned aerial vehicle can be controlled to start the reversed flight path at approximately the ending point of the initial flight path, without landing on the field, thereby saving the amount of time needed to complete the autonomous scouting of the field.

In various implementations, the unmanned aerial vehicle can be configured to fly at a first height (e.g., predefined as approximately 20 m or 35 m) along the initial flight path at a first predefined speed (e.g., approximately 1-2 m/s). When the unmanned aerial vehicle flies at the first height along the initial flight path, a first sensor (e.g., a first image-capturing sensor) carried by the unmanned aerial vehicle can be configured to collect a plurality of images (e.g., $image_1$ . . . , $image_x$, . . . $image_N$) for the field, where the plurality of images can optionally be collected at a first frequency (e.g., approximately 0.1 s). Here, the first frequency of the first sensor in collecting the plurality of images and the initial flight path can be so determined or selected that the plurality of images collected by the first sensor together cover an entire area of the field. Optionally, in some implementations, metadata (e.g., timestamp, coordinate information, etc.) can be collected for each of the plurality of images captured by the first sensor. As a non-limiting example, the metadata can include a location of the unmanned aerial vehicle when the first sensor collects a respective image (e.g., $image_x$) of the plurality of images (e.g., $image_1$~$image_N$). In this example, the location of the unmanned aerial vehicle when the first sensor collects the respective image (e.g., $image_x$), along with the first height and a pointing angle of the first sensor, can determine a location (e.g., coordinate information) for a portion of the field that is captured by the respective image (e.g., $image_x$).

In various implementations, the unmanned aerial vehicle can include or carry an edge-computing device (e.g., having one or more tensor processing units (TPUs) and/or graphics processing units (GPUs), and a memory storing one or more machine learning models) to process the plurality of images (e.g., $image_1$~$image_N$) collected by the first sensor. In various implementations, the edge-computing device can access a first machine learning model (coarse-grained) from the one or more machine learning models, and apply the first machine learning model can be used to process the plurality of images (e.g., $image_1$~$image_N$) collected by the first sensor while the unmanned aerial vehicle is flying along the initial flight path. For instance, each image of the plurality of images (e.g., $image_1$~$image_N$) can be transmitted to be processed as input using the first machine learning model, where such transmission occurs in response to the first sensor collecting the respective image. In this case, the first machine learning model can process each image of the plurality of images (e.g., $image_1$~$image_N$) as input, to generate a corresponding output, where the output can be generated to indicate whether one or more target objects (e.g., anomalies such as weed) are detected for the field. Alternatively or additionally, the output can indicate target region(s) (which can be a dot, a point, a rectangular region or in other shapes when viewed from the first height) that the one or more target objects correspond to.

In some implementations, the output can be generated within a predetermined period of time since a corresponding image (e.g., $image_x$, based on which the output is generated) is collected by the first sensor. For instance, the output generated based on processing $image_x$ can be generated before the first sensor collects a next image (i.e., $image_{x+1}$) that is next to the $image_x$. Optionally, based on the corresponding outputs generated by the first machine learning model for the plurality of images (e.g., $image_1$~$image_N$), one or more stops can be determined to define the aforementioned reversed flight path, where along the reversed flight path, the unmanned aerial vehicle can be operated to fly at a lower height ("second height") to collect fewer but more accurate images for the field. Relevant descriptions for determining the one or more stops (intermediate stops or optimal stops) can be found later in this disclosure.

As a non-limiting example, the first machine learning model can be an object detection model trained to process an image, thereby detecting one or more target objects (e.g., weed, diseased crop, fire, etc.) from the processed image. In this example, the first machine learning model can be used to process a respective image (e.g., $image_x$) of the aforementioned plurality of images (e.g., $image_1$~$image_N$ collected by the first sensor) in response to the respective image being collected by the first sensor, and process the respective image (e.g., $image_x$) to generate a respective output. Here, the generated respective output can indicate whether a target object (e.g., target weed, target pest, target disease) is detected within a portion of the field that is captured by the respective image. Optionally, in the case where a target object is detected, the generated respective output can further indicate a target region/area that includes the detected target object.

In some embodiments, if the target object is detected from the respective image, the respective output generated by the first machine learning model for the respective image can alternatively, or additionally, include: a bounding box surrounding/outlining the detected target object, and/or a label (e.g., an object label such as a weed label or a disease label) assigned to the detected target object. Optionally, instead of or in addition to the bounding box and/or the label, the generated respective output of the first machine learning model for the respective image (e.g., image$_x$) can include, or be applied to, determine a percentage (e.g., approximately 60%) of a target weed (e.g., thistle, bindweed, or buckhorn) in the portion of the crop field captured in the respective image (e.g., image$_x$), or a percentage of the crops exhibiting a trait of dehydration or disease.

Continuing with the non-limiting example described above, based on the respective output generated by the first machine learning model (i.e., the object detection model) and/or the location (e.g., coordinate information) for the portion of the field captured by the respective image (e.g., image$_x$), the edge-computing device can determine a respective target region within the field or a respective point that represents the respective target region, where the respective point (or the respective target region) represents a location (and/or area) of the detected target object in the field. In this way, after the plurality of images (e.g., image$_1$~image$_N$) are processed using the first machine learning model, the edge-computing device can determine all target object(s) potentially present within the field, for targeted data collection and study of these target object(s). For instance, before the unmanned aerial vehicle reaches the ending point of the initial flight path, the edge-computing device can determine one or more points within the field, where the one or more points respectively represents a location of the detected target object(s) in the field, for planning one or more stops at which the unmanned aerial vehicle can capture images with higher resolution or other data regarding these target object(s).

In some embodiments, the one or more determined points within the field that respectively represent a location of the detected target object(s) in the field can be applied to determine one or more intermediate stops for the unmanned aerial vehicle, where the one or more intermediate stops are applied to generate the reversed flight path, along which the unmanned aerial vehicle flies at the second height. For instance, when each two adjacent points of the one or more determined points satisfy (e.g., exceeds) a first distance threshold, the one or more intermediate stops (above the ground/field) forming the reversed flight path can be determined to each correspond to one of the one or more determined points within the field, except for being above the field and having a height (i.e., the second height). At each intermediate stop, the unmanned aerial vehicle can enable the first sensor and/or a second sensor (e.g., a second image-capturing sensor), to collect a target image that depicts at least one target object of the field and/or other data.

Alternatively, the one or more determined points within the field can be processed (e.g., clustered and/or removed), based on one or more conditions, to determine one or more optimal stops (sometimes referred to simply as "one or more stops") forming the reversed flight path. By clustering the one or more determined points and/or removing certain determined point(s) to acquire the one or more optimal stops, the number of stops at which the unmanned aerial vehicle is configured to collect target image(s) and/or other data can be reduced, thereby reducing the number of images and/or other data that the unmanned aerial vehicle needs to collect (and/or process) when flying along the reversed flight path, as well as reducing the burden on the unmanned aerial vehicle's battery.

The one or more conditions can include one or more distance conditions indicating, for example, whether distances between each two of the one or more determined points fail (i.e., less than) a second distance threshold, where the second distance threshold can be less than or equal to the first distance threshold. The one or more conditions can alternatively or further include one or more sensor conditions, for example, indicating a pointing angle and a field of view of a sensor (be it the first sensor, the second sensor, or other sensors) that the unmanned aerial vehicle relies on to collect target image(s) along the reversed flight path. The one or more conditions can alternatively or further include one or more UAV conditions indicating, for example, a battery condition that indicates a remaining battery life of a battery that powers the unmanned aerial vehicle at the ending point, and/or a height condition indicating the second height at which the unmanned aerial vehicle is configured to fly along the reversed flight path.

For instance, processing the one or more determined points can include: clustering the one or more determined points into one or more groups, based on one or more first conditions, including but are not limited to: (1) the distances between each two of the one or more determined points, (2) a location (and/or area) of a respective determined point, of the one or more determined points. (3) the second height, (4) the pointing angle and the field of view of a sensor used to capture target image(s) along the reversed flight path. For each of the one or more clustered groups, a central point (sometimes referred to as "center") for a respective clustered group can be determined, and the one or more optimal stops can be determined as respectively corresponding to the one or more central points, except for the one or more optimal stops being above ground/field and are configured at the second height. Alternatively or additionally, processing the one or more determined points within the field can include: removing one or more points from the one or more determined points, and the remaining points can be used to determine the one or more optimal stops. Removing one or more points from the one or more determined points can be based on but are not limited to: (i) a remaining battery of the unmanned aerial vehicle at the ending point of the initial flight path, (ii) a location and/or area of the one or more determined points within the field, and/or (iii) and predicted accuracies of the target object(s) being detected at the one or more determined points.

In various implementations, the unmanned aerial vehicle can lower itself from the ending point of the initial flight path to reach an initial stop of the reversed flight path that corresponds to (i.e., the initial stop and the ending point having substantially the same projection on the ground) the ending point. Here, the unmanned aerial vehicle can be configured to lower from the first height at the ending point to the second height (e.g., approximately 10 m) at the initial stop, without landing on the ground of the field (if the remaining battery of the unmanned aerial vehicle is sufficient to complete the reversed flight path). Alternatively, the unmanned aerial vehicle can land at the ending point of the initial flight path, e.g., to charge/replace the battery, and take off at the initial stop (to which the ending point corresponds) to start the reversed flight path. Optionally, the unmanned aerial vehicle can further lower itself, from the second height to a third height lower than the second height, in response to an output generated by a second machine learning model in processing an image captured at one of the one or more stops of the reversed flight path indicates that more accurate image(s) or image(s) with a better resolution are needed. The second machine learning model can be finer-grained than the first machine learning model to possess stronger computing capabilities (but sometimes longer processing time). More descriptions of the second machine learning model are provided later in this disclosure.

The reversed flight path can be defined using the aforementioned one or more optimal stops (or the aforementioned one or more intermediate stops), at which the unmanned aerial vehicle is operated to fly at the second height lower than the first height. In various implementations, while flying at the second height along the reversed flight path, the unmanned aerial vehicle is operated to collect a target image at each of the one or more optimal stops (or intermediate stops), via a second sensor. Optionally, the second sensor can be the same as the first sensor, or the second sensor can be different from the first sensor. For instance, the second sensor can have a higher resolution than the first sensor, a greater field of view than the first sensor. Alternatively or additionally, in addition to the first and second sensors, a third sensor can be carried by the unmanned aerial vehicle to collect an additional image or other data at each of the one or more optimal (or intermediate) stops, where the third sensor and the first sensor are of different types (e.g., one being optical and one being thermal).

In various implementations, instead of the images (a majority of which may have been discarded instantly after identifying no target object therefrom, to save the memory resources of the unmanned aerial vehicle) collected by the first sensor during the initial flight path, the target images collected by the second sensor during the reversed flight path can be applied to evaluate one or more characteristics (e.g., pest detection, percentage of one or more types of weeds) of the field. For instance, while the unmanned aerial vehicle is flying along the reversed flight path, the target images can be transmitted to the edge-computing device of the unmanned aerial vehicle. The edge-computing device may access a second machine learning model (e.g., fine-grained), of the aforementioned one or more machine learning models, to process the target images. Here, the second machine learning model can be a finer-grained model (e.g., trained more extensively or possess more components such as neurons) than the first machine learning model, and an output of the second machine learning model generated by processing a respective target image can be applied to determine the one or more characteristics (an amount of undesired weeds) of the field. Optionally, the second machine learning model can process a respective target image as input, in response to the respective image being captured by the second sensor at a respective stop, of the one or more stops of the reversed flight path.

Optionally or additionally, in some implementations, a ground robot can be configured to travel along a traveling path (e.g., to which the reversed flight path corresponds), where the ground robot can collect one or more ground images for each spot of the field that corresponds to a respective optimal stop (or intermediate stop) along the reversed flight path.

The above description is provided as an overview of only some implementations disclosed herein for the sake of example. Those implementations, and other implementations, are described in additional detail hereinbelow.

BRIEF DESCRIPTION OF THE DRAWINGS

FIG. 7 illustrates an example method for autonomous scouting of a field, for practicing certain aspects of the present disclosure, in accordance with various implementations.

DETAILED DESCRIPTION

Figure 1:
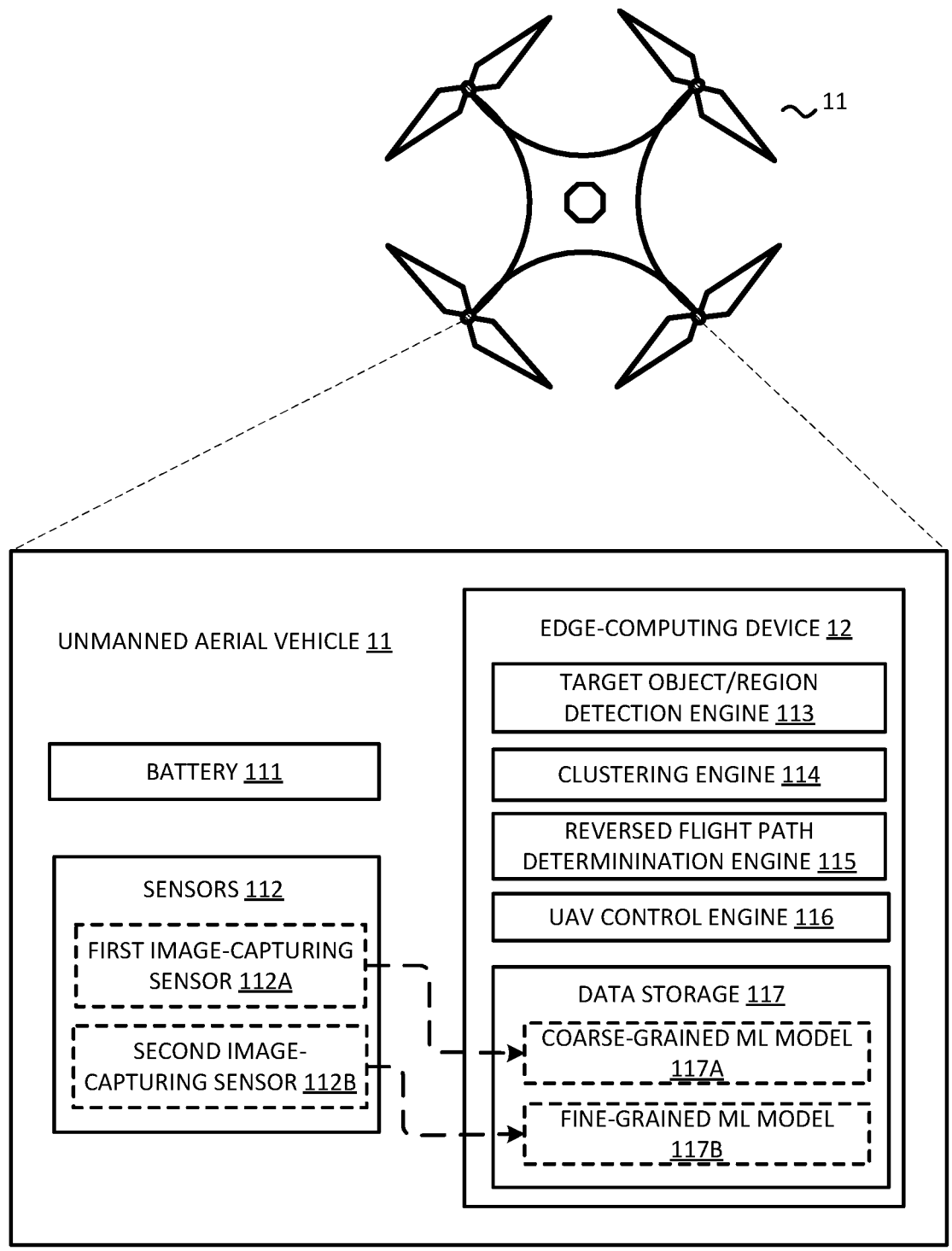
FIG. 1 illustrates an example unmanned aerial vehicle with components thereof, for practicing certain aspects of the present disclosure, in accordance with various implementations.

The following description with reference to the accompanying drawings is provided for understanding of various implementations of the present disclosure. It's appreciated that different features from different embodiments may be combined with and/or exchanged for one another. In addition, those of ordinary skill in the art will recognize that various changes and modifications of the various embodiments described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used by the inventor(s) to enable a clear and consistent understanding of the present disclosure. Accordingly, it should be apparent to those skilled in the art that the following description of various embodiments of the present disclosure is provided for the purpose of illustration only and not for the purpose of limiting the present disclosure as defined by the appended claims and their equivalents.

In various implementations, systems and methods are provided for improved autonomous scouting of a field (e.g., crop field). In various implementations, an unmanned aerial vehicle ("UAV", may also be referred to as a "drone", etc.) having one or more sensors is utilized to perform autonomous scouting for a field, during which the UAV is configured to fly above the field along an initial flight path at a first height, followed by a reversed flight path at a second height lower than the first height. When flying along the initial flight path, the UAV can be controlled to capture images and/or other data comprehensive enough for detecting all possible anomalies (e.g., target objects) within the field and/or identifying all target region(s) exhibiting anomalies within the field. When flying along the reversed flight path, the UAV can be controlled to capture target images depicting the detected target object(s) and/or target region(s), for targeted and in-depth evaluation of the field. As a result, proper and prompt measures can be determined and applied to address any anomaly detected from the field, thereby ensuring that the field is in healthy conditions.

In various implementations, the UAV can be controlled to fly along the initial and reversed flight paths using an edge-computing device that is disposed on the UAV or that is integrated with the UAV. The edge-computing device, or the UAV, can include one or more processors and memory storing instructions that, when executed, control the UAV to flight along an initial flight path that is planned for the field. The memory of the edge-computing device can further include a first machine learning model (which can be a coarse-grained machine learning model). The coarse-grained machine learning model may be applied to process data (e.g., images) collected by the one or more sensors of the UAV, to detect anomaly (e.g., weeds, pest, plant disease, etc.) within the field before the UAV reaches an ending point of the initial flight path for autonomous scouting.

In various implementations, locations (including regions) of the detected anomalies can be determined based on output of the coarse-grained machine learning model. Such locations can be clustered to determine the reversed flight path for the UAV to fly along. In various implementations, the UAV can fly along the reversed flight path at the second height lower than the first height, so that even using the same one or more sensors mentioned above, the UAV can acquire data with greater resolution or accuracy for further analysis of the anomalies. In various implementations, when flying along the reversed flight path, the UAV can be configured to capture data at one or more stops corresponding to one or more clustered locations determined by clustering locations of the detected anomalies. As a result, less but more accurate data captured by the UAV during the reversed flight path can be processed by a second machine learning model (e.g., a fine-grained machine learning model stored in the memory of the edge-computing device), which results in timely, further and more accurate analysis of the anomalies within the field. Features and advantages of the systems and methods for autonomous scouting described herein are not intended to be limiting, and more features and advantages are discussed elsewhere in the present disclosure.

FIG. 1 illustrates a non-limiting example of an unmanned aerial vehicle with components thereof, for practicing certain aspects of the present disclosure, in accordance with various implementations. As shown in FIG. 1, an unmanned aerial vehicle 11 ("UAV", may also be referred to as a "drone", etc.) can include a battery 111, and one or more sensors 112. The UAV 11 can further include, or be coupled to, an edge-computing device 12, where the edge-computing device 12 can include a target object/region detection engine 113, a clustering engine 114, a reversed flight path determination engine 115, a UAV control engine 116, and/or a data storage 117.

In some implementations, optionally, the one or more sensors 112 can include a first image-capturing sensor 112A and a second image-capturing sensor 112B, where the second image-capturing sensor 112B has a higher resolution than the first image-capturing sensor 112A. In some implementations, the data storage 117 can store a coarse-grained machine learning model 117A trained to detect one or more target objects (e.g., weed, pest, or weed & pest) and a fine-grained machine learning model 117B trained to detect or further characterize the one or more target objects. Optionally, the data storage 117 can further store one or more initial flight paths each planned for a respective field, of a plurality of fields that are to be scouted.

In various implementations, the one or more initial flight paths can be determined based on the battery 111, one or more parameters (area, terrain, arrangement and/or type of plants, etc.) relating to each field of the plurality of fields to be scouted, one or more parameters (field of view, resolution, pointing angle, etc.) relating to the one or more sensors 112, and/or other factors. Optionally, given a particular field of the plurality of fields, the UAV 11 can be controlled by the UAV control engine 116 to fly at a first height (e.g., approximately 20 m or 35 m) along an initial flight path correspondingly determined for the particular field. Optionally, the UAV control engine 116 can control a speed and a flying height (e.g., the first height) of the UAV 11 when the UAV 11 flies along the initial flight path.

In various implementations, the first image-capturing sensor 112A can be applied to capture images of a particular field at a first frequency when the UAV 11 flies along the initial flight path determined for the particular field. In this instance, the images captured for the particular field at the first frequency can be processed using the coarse-grained machine learning model 117A to detect the number, type(s) and/or area(s) of target object(s) within the particular field.

As a non-limiting example, the target object detection engine 113 can process an image, of the images, captured for the particular field at the first frequency, using the coarse-grained machine learning model 117A, to determine whether the image depicts a target object. Optionally, the target object detection engine 113 can process the image, of the images captured for the particular field at the first frequency, in response to the one or more sensors 112 capturing the image. In this non-limiting example, the target object detection engine 113 can label any detected target object within the image for anomaly type, location, and/or area, based on output of the coarse-grained machine learning model 117A that processes the image as input. Once labeled, a location and/or area of a detected target object can be determined with respect to the image, so that a location of the detected target object within the particular field can be determined. In this way, after the target object detection engine 113 finishes processing all the images captured for the particular field that cover an entire area of the particular field, the number and location(s) of one or more target objects (if there are any) can be determined.

In various implementations, the number and locations of the one or more target objects can be determined before the UAV 11 reaches an ending point of the initial flight path that is planned for the particular field. Optionally, the reversed flight path determination engine 115 can determine one or more intermediate stops forming a reversed flight path for the UAV 11 to fly along over the particular field, where the one or more intermediate stops respectively correspond to the locations of the one or more target objects (despite that the one or more intermediate stops are configured at a second height, while the locations of the one or more target objects are on ground within the particular field). Alternatively, the clustering engine 114 can be applied to cluster the locations of the one or more target objects to determine one or more optimal stops at which the UAV 11 can capture target images, and the reversed flight path determination engine 115 can determine a reversed flight path based on the one or more optimal stops.

In various implementations, the reversed flight path determination engine 115 can determine a second height at which the UAV 11 flies along the reversed flight path. The UAV control engine 116 can control the UAV 11 to fly at the second height along the reversed flight path (formed by the one or more intermediate stops, or formed by the one or more optimal stops). For instance, the UAV control engine 116 can control the UAV 11 to lower the UAV 11 from the first height to the second height, for the UAV 11 to start the reversed flight path.

In some implementations, the clustering engine 114 can cluster the locations of the one or more target objects by grouping two or more locations of the target objects that satisfy a distance threshold into a corresponding group ("cluster"). Alternatively or additionally, the clustering engine 114 can cluster the locations of the one or more target objects by removing a location of the target object that is too distant from other locations of the target object, where the volume of the target object at this location fails to satisfy a volume threshold, or for other concerns.

In various implementations, the reversed flight path determination engine 115 determines the reversed flight path and/or the second height at which the UAV 11 is to fly along the reversed flight path, before the UAV 11 starts the reversed flight path (e.g., before the UAV 11 reaches an ending point of the initial flight path). In various implementations, the UAV control engine 116 controls the UAV 11 to lower from the first height to the second height at approximately the ending point of the initial flight path, to start the reversed flight path, where the UAV control engine 116 controls the one or more sensors 112 (e.g., the first image-capturing sensor 112A) of the UAV 11 to capture one or more target image at each of the one or more optimal stops (or intermediate stops). By controlling the first image-capturing sensor 112A to capture target images at the one or more optimal (or intermediate) stops during the reversed flight path instead of capturing images at a constant frequency (e.g., 0.1 s, the first frequency determined for the initial flight path), the total number of images that are needed for targeted and in-depth evaluation (e.g., for processing using the fine-grained machine learning model) can be reduced.

Alternatively, the second image-capturing sensor 112B, having a higher resolution than that of the first image-capturing sensor 112A, can be applied to capture the one or more target images, thereby providing more precise or clearer images to facilitate any subsequent analysis of the target object detected within the particular field and/or disease treatment (if needed). For instance, the fine-grained machine learning model 117B can process a target image, of the one or more target images, to more precisely or to additionally determine one or more properties (e.g., type or sub-classification, area, etc.) of the detected target object.

Figure 2A:
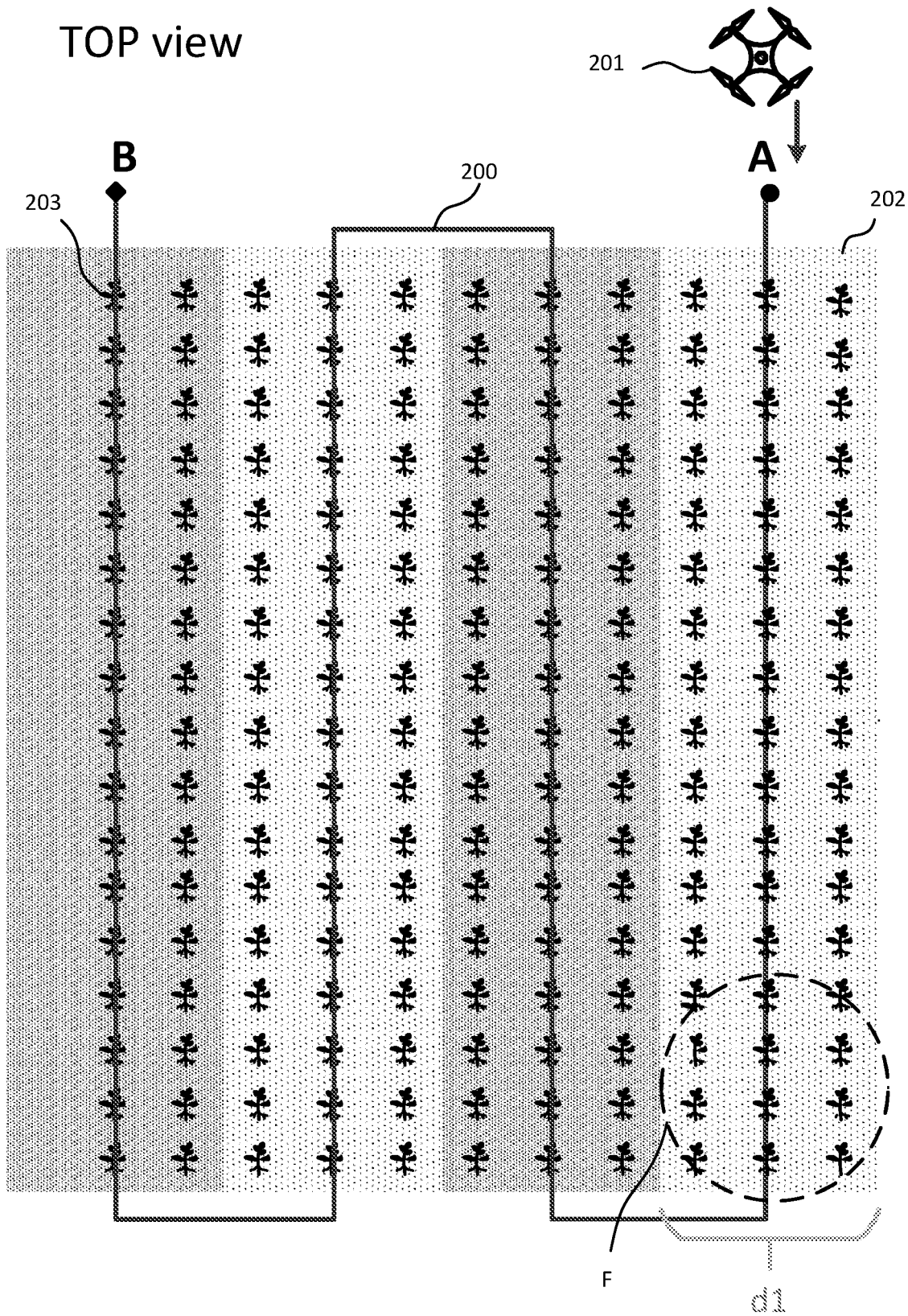
FIG. 2A illustrates a top view of a field showing an example initial flight path for an unmanned aerial vehicle to fly along starting from point A and ending at point B, for practicing certain aspects of the present disclosure, in accordance with various implementations.
Figure 2B:
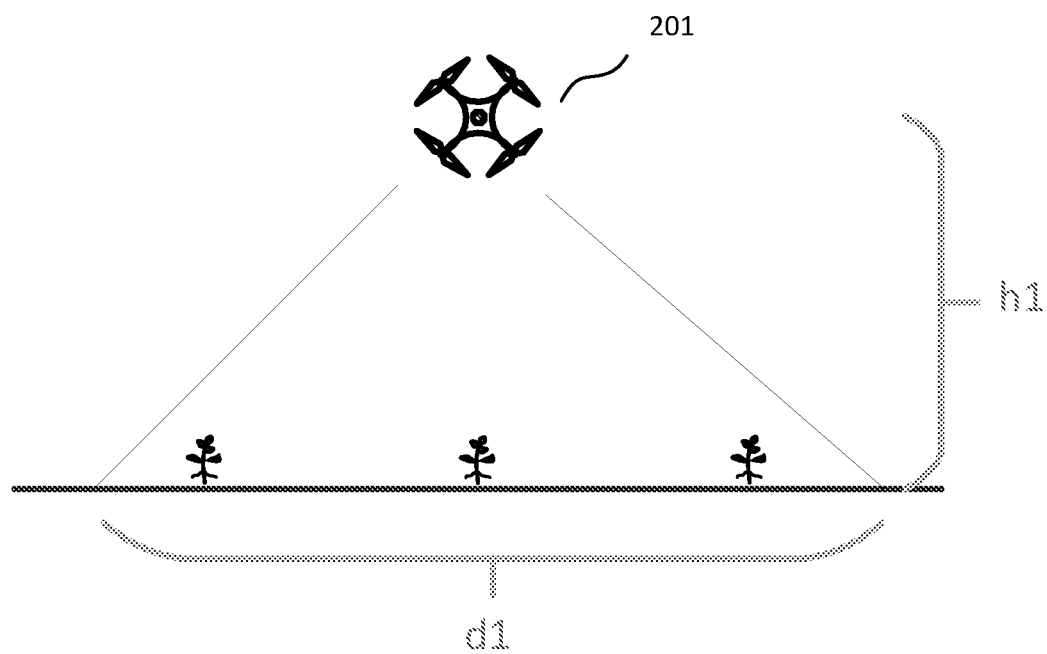
FIG. 2B illustrates a front view of the field in FIG. 2A showing a first height at which the unmanned aerial vehicle flies along the initial flight path, for practicing certain aspects of the present disclosure, in accordance with various implementations.

FIG. 2A illustrates a top view of a field showing an example initial flight path 200 having a starting point A and an ending point B, for an unmanned aerial vehicle 201 to fly along over a field 202 in which a plurality of plants 203 are planted/arranged in a pattern having multiple rows, for practicing certain aspects of the present disclosure, in accordance with various implementations. FIG. 2B illustrates a front view of the field 202 in FIG. 2A showing a first height h1 at which the unmanned aerial vehicle 201 flies along the initial flight path 200, for practicing certain aspects of the present disclosure, in accordance with various implementations.

As shown in FIG. 2A, the initial flight path 200 for the unmanned aerial vehicle 201 to fly along can be determined based on factors including a total area of the field 202, an arrangement of plants 203 within the field 202, and a position (see height of the unmanned aerial vehicle in 201 FIG. 2B) and field of view (indicated by dashed circle "F" having a diameter of "d1", as shown in FIG. 2A/2B) of one or more image-capturing sensors of the unmanned aerial vehicle 201, battery life of a battery that powers the unmanned aerial vehicle 201, and/or other factors. For instance, the unmanned aerial vehicle 201 can raise to a first height at the starting point A and start flying along the initial flight path 200, where the one or more sensors (e.g., the first image-capturing sensor 112A in FIG. 1) of the unmanned aerial vehicle 201 can capture images and/or other data that characterize the field 202 (e.g., at a first frequency), so that the captured images and/or other data can cover an entire area of the field 202.

Figure 2C:
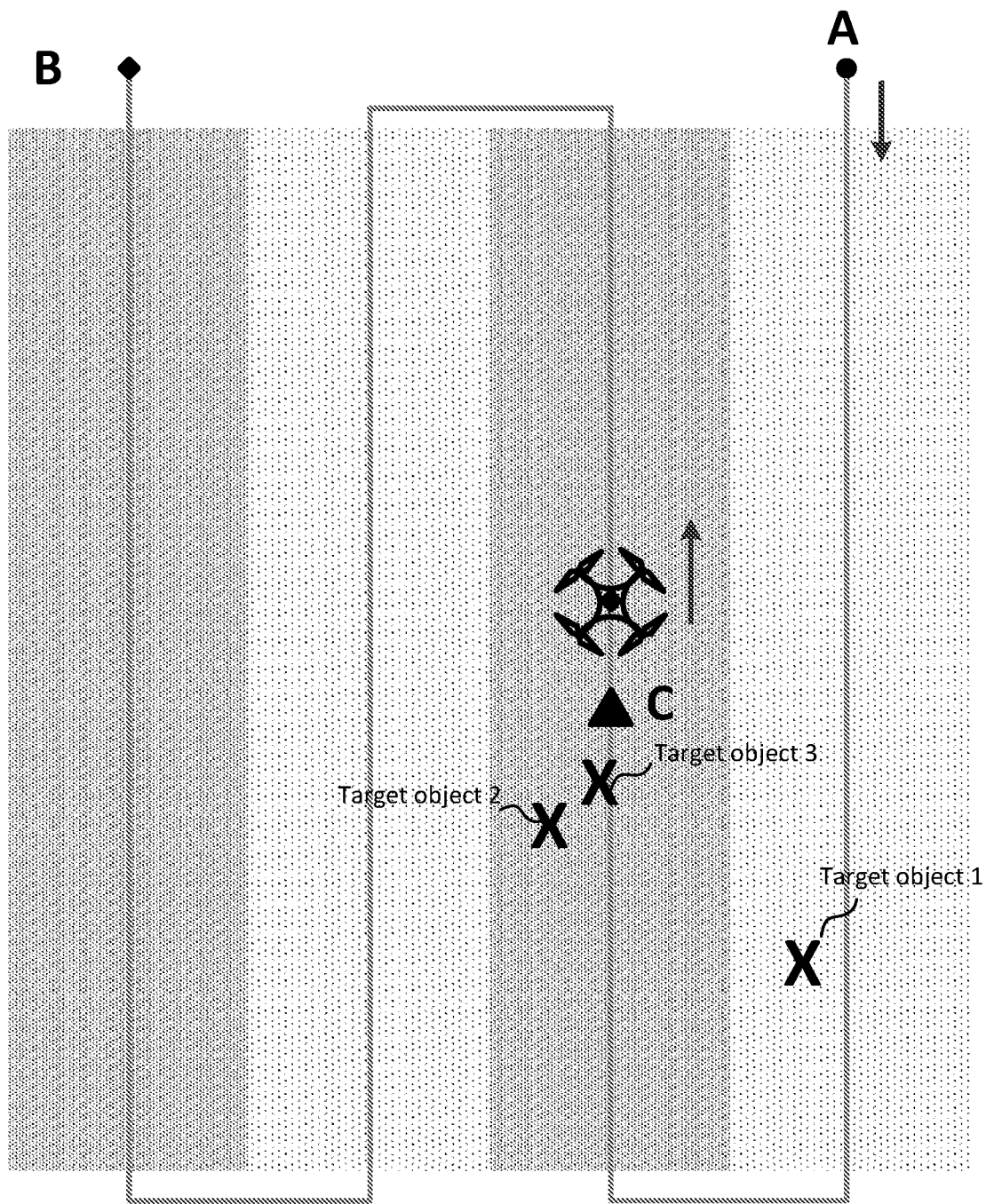
FIG. 2C illustrates onboard/edge-computing detection of target objects (e.g., weeds) when the unmanned aerial vehicle in FIG. 2B is flying along the initial flight path, for practicing certain aspects of the present disclosure, in accordance with various implementations.
Figure 2D:
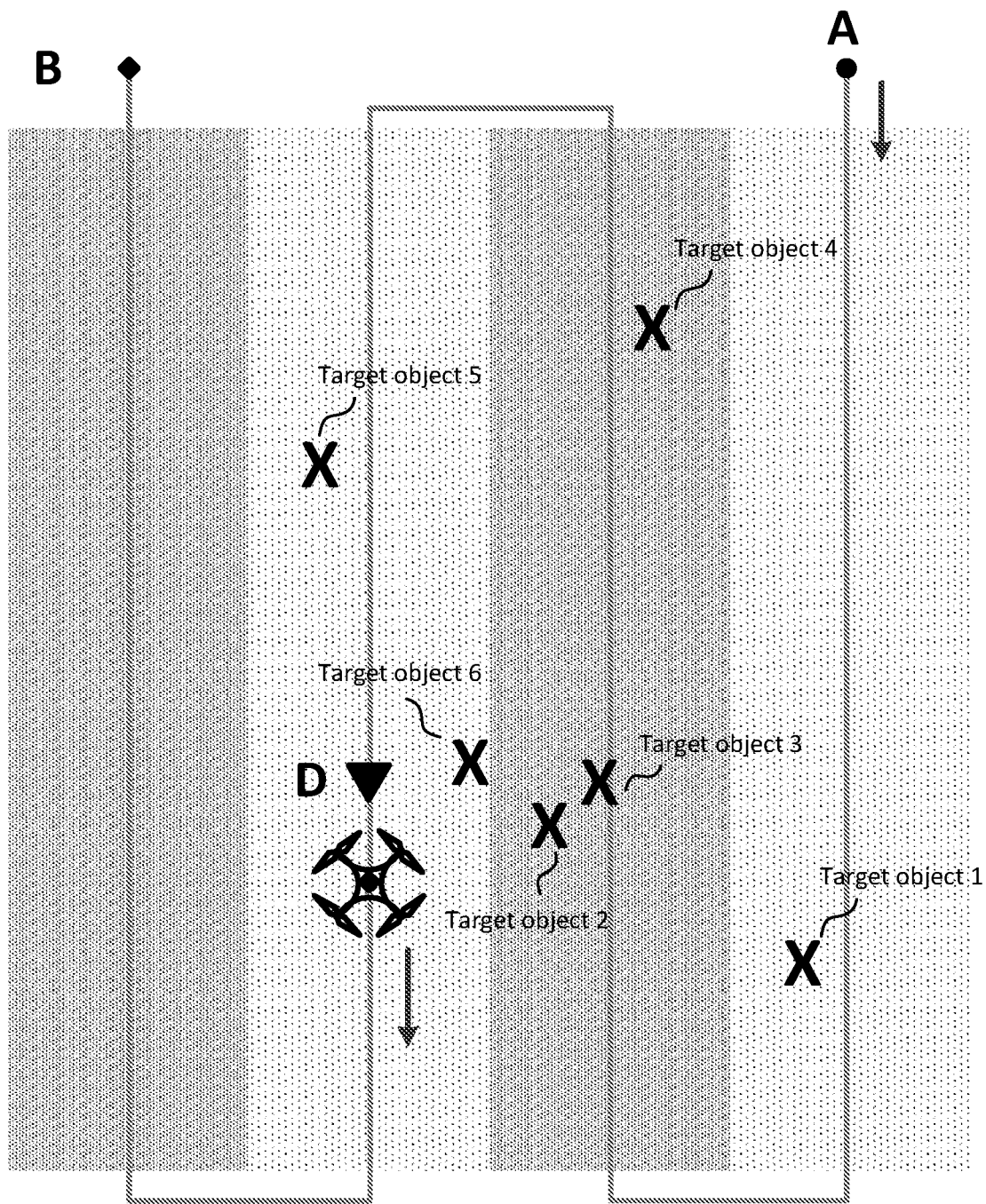
FIG. 2D illustrates onboard/edge-computing detection of additional target object(s) when the unmanned aerial vehicle in FIG. 2B continues flying along the initial flight path, for practicing certain aspects of the present disclosure, in accordance with various implementations.
Figure 2E:
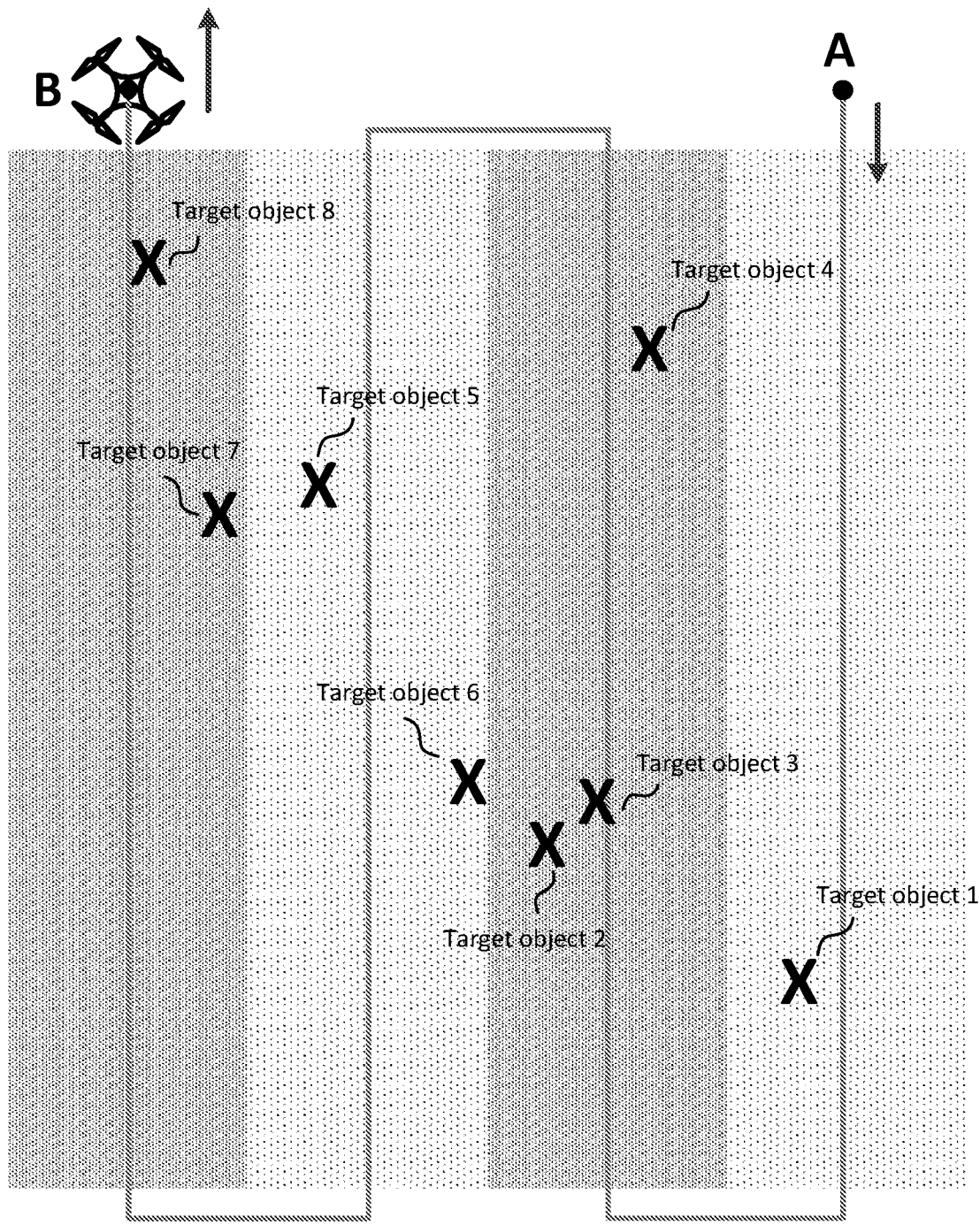
FIG. 2E illustrates onboard/edge-computing detection of all target objects potentially present throughout the field when the unmanned aerial vehicle in FIG. 2B reaches the ending point of the initial flight path, for practicing certain aspects of the present disclosure, in accordance with various implementations.

FIG. 2C illustrates onboard detection of weeds (as target object) when the unmanned aerial vehicle 201 in FIG. 2B is flying along the initial flight path 200, for practicing certain aspects of the present disclosure, in accordance with various implementations. FIG. 2D illustrates onboard detection of additional weeds (in addition to the weeds in FIG. 2C) when the unmanned aerial vehicle 201 in FIG. 2B continues flying along the initial flight path 200, for practicing certain aspects of the present disclosure, in accordance with various implementations. FIG. 2E illustrates detection of weeds throughout the field 200 when the unmanned aerial vehicle 201 in FIG. 2B reaches the ending point B of the initial flight path 200, for practicing certain aspects of the present disclosure, in accordance with various implementations. It's noted that the plants 203 in FIG. 2A are not depicted in FIGS. 2C~2E to more clearly show detected weeds in these figures.

As shown in FIG. 2C, the unmanned aerial vehicle 201 can start the initial flight path 200 from the starting point A, and can fly passing a first immediate point C (note that stopping at the first immediate point C is not required when the unmanned aerial vehicle 201 is configured to capture images at a constant frequency, e.g., the first frequency). When flying from the starting point A to the first immediate point C, the unmanned aerial vehicle 201 can capture a first plurality of images each corresponding to a portion of the field 202. For instance, the unmanned aerial vehicle 201 can enable one or more image-capturing sensors (e.g., a first sensor such as the first image-capturing sensor 112A in FIG. 1) to capture images at a predetermined frequency (e.g., the first frequency) when flying from the starting point A to reach the first immediate point C, so that the first plurality of images are obtained. The unmanned aerial vehicle 201 can include a coarse-grained machine learning (ML) model (117A in FIG. 1) to process each of the first plurality of images as an input, to generate an output relating to target objection detection.

In various implementations, the output of the coarse-grained ML model can indicate existence of one or more types of target objects within a portion of the field 202 captured by a corresponding image, of the first plurality of images. Alternatively or additionally, the output of the coarse-grained ML model can indicate an identification or type (e.g., be it a weed or pest, or other anomalies) of a detected target object. Alternatively or additionally, the output of the coarse-grained ML model can indicate a region (may be referred to as "target region") or area of a detected target object. Optionally, based on the output of the coarse-grained ML model, a location of a respective target region (or target object) within the field 202 can be determined.

Optionally, the coarse-grained ML model (117A) can be configured to process an image immediately when, or within a short period (0.05 s) of, the corresponding image being captured, thereby detecting whether each of the plurality of images includes one or more target objects in a timely manner. In this case, soon after passing the first immediate point C, the unmanned aerial vehicle 201 can determine that target objects 1~3 (each indicated using a symbol "X") are detected, and can further determine a location for each of the target objects 1~3 within the field 202. For instance, the unmanned aerial vehicle 201 can determine that one of the captured images includes a target object 1, and an additional image of the captured images includes a target object 2 and a target object 3.

Referring to FIG. 2D, the unmanned aerial vehicle 201 can continue flying after passing the first immediate point C, to pass a second immediate point D. When the unmanned aerial vehicle 201 flies from the first immediate point C to the second immediate point D, the unmanned aerial vehicle 201 can further capture a second plurality of images. The coarse-grained machine learning model can process each of the second plurality of images, to determine whether each of the second plurality of images includes one or more target objects immediately (e.g., approximately 0.05 s) after the unmanned aerial vehicle 201 passes the second immediate point D. As shown in FIG. 2D, the unmanned aerial vehicle 201 can determine, based on processing of the second plurality of images using the coarse-grained machine learning model, that three images of the second plurality of images each detect a target object. For instance, the coarse-grained machine learning model can determine that three target objects 4~6 are detected from the second plurality of images that are captured by the one or more image-capturing sensors of the unmanned aerial vehicle 201 when the unmanned aerial vehicle 201 flies from the first immediate point C and the second immediate point D.

In the above instance, the coarse-grained machine learning model (117A) can be used to detect target object 4 from one image, of the second plurality of images, in response to the one image being captured, can detect target object 5 from an additional image (of the second plurality of images) in response to the additional image being captured, and can detect target object 6 from a further image (of the second plurality of images) in response to the further image being captured. The coarse-grained machine learning model can label each of the three detected target objects 4~6 in a corresponding image, of the second plurality of images, so that a location of each of the three detected target objects 4~6 within the field 202 can be determined.

Referring to FIG. 2E, the unmanned aerial vehicle 201 can continue flying after passing the second immediate point D, to arrive at the ending point B of the initial flight path. When the unmanned aerial vehicle 201 flies from the second immediate point D to the ending point B, the unmanned aerial vehicle 201 can further capture a third plurality of images. The coarse-grained machine learning model can process each of the third plurality of images, to determine whether each of the third plurality of images includes one or more target objects before the unmanned aerial vehicle 201 arrives at the ending point B. As shown in FIG. 2E, the unmanned aerial vehicle 201 can determine, based on processing of the third plurality of images using the coarse-grained machine learning model, that two of the third plurality of images each detect a target object.

For instance, the coarse-grained machine learning model can determine that target objects 7 and 8 are detected from the further plurality of images that are captured by the one or more image-capturing sensors of the unmanned aerial vehicle 201 when the unmanned aerial vehicle 201 flies from the second immediate point D to the ending point B. The coarse-grained machine learning model can label each of the two detected target objects 7~8 in a corresponding image, of the further plurality of images, so that a location of each of the two detected target objects 7~8 within the field 202 can be determined. It's noted that the immediate points C and D are depicted for illustrations only and are not intended to be limiting, and that the target objects (e.g., target object 1) can be weeds, a dehydrated plant, pests, or other anomalies to be evaluated for the field 202.

In the above non-limiting example illustrated using FIGS. 2C~2E, prior to arriving at the ending point B, the unmanned aerial vehicle 201 can determine, using the coarse-grained machine learning model (117A), that the field 202 includes a plurality of target objects (i.e., target objects 1~8), and the unmanned aerial vehicle 201 can determine a location for each of the target objects 1~8 within the field 202. These locations can be clustered using approaches, for instance, illustrated using FIG. 3A, 3C, or 3D.

Figure 3A:
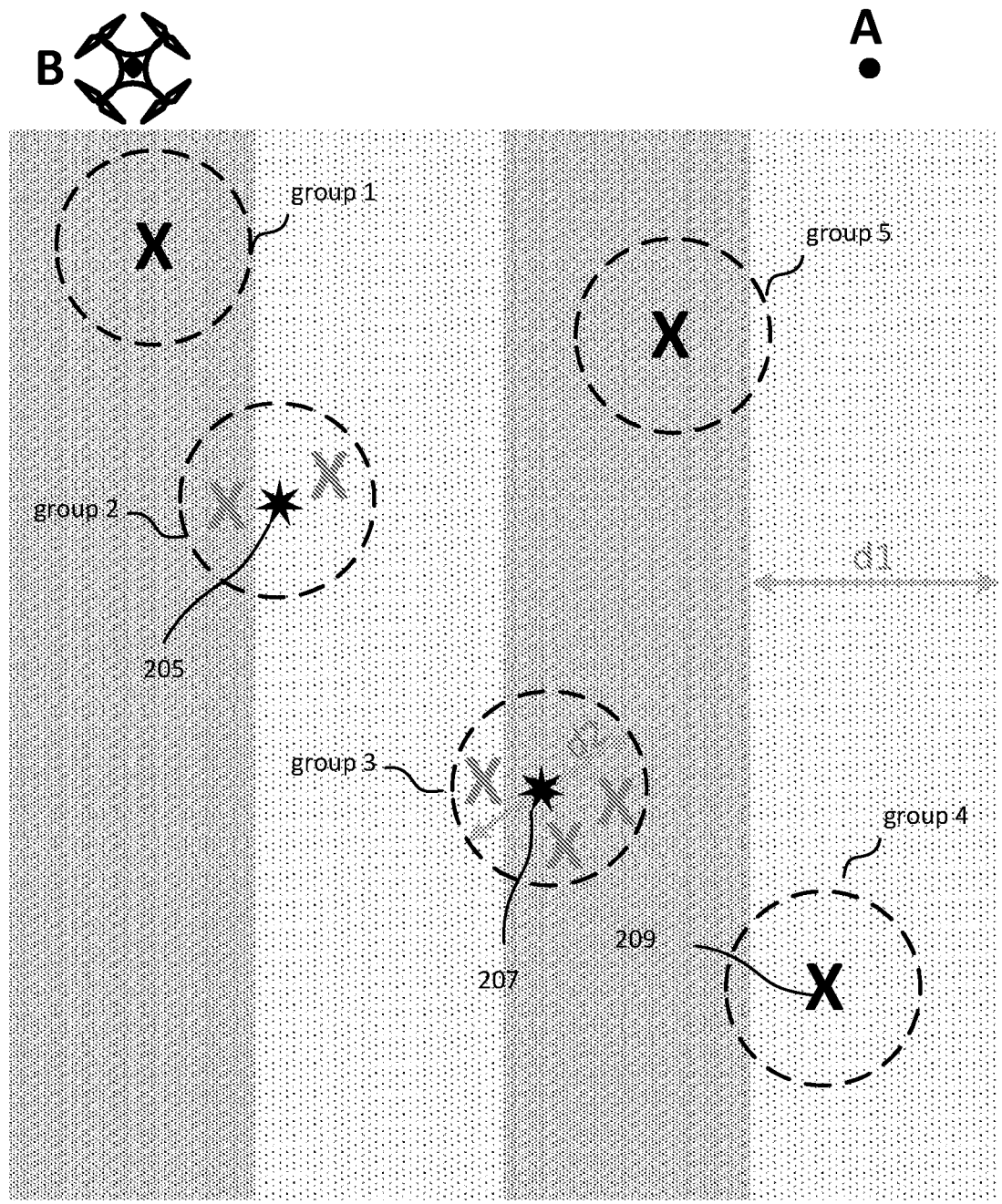
FIG. 3A illustrates an example approach for clustering target object(s) or target region(s) detected in FIG. 2E before the unmanned aerial vehicle starts a reversed flight path from point B, for practicing certain aspects of the present disclosure, in accordance with various implementations.

FIG. 3A illustrates clustering of weed locations detected in FIG. 2E before the unmanned aerial vehicle starts a reversed flight path from point B, for practicing certain aspects of the present disclosure, in accordance with various implementations. As shown in FIG. 3A, before, when, or shortly after the unmanned aerial vehicle 201 arrives at the ending point B, the unmanned aerial vehicle 201 can determine, using the coarse-grained machine learning model, a location (or region) for each of the target objects 1~8 within the field 202. The unmanned aerial vehicle 201 can cluster the locations to which the target objects 1~8 respectively correspond, into a plurality of clustered groups (i.e., group 1, group 2, group 3, group 4, and group 5 as illustrated in FIG. 3A). For instance, the group 1 can include the target object 8, and can optionally be centered on target object 8.

As another example, the group 2 can include the target objects 5 and 7 determined from different images captured by the first sensor, and can have a center ("central point") 205 determined based on, for instance, a field of view (indicated by the dashed circle having a diameter of "d2") and point angle of the second sensor, as well as locations of the target objects 5 and 7. The group 3 can include the target objects 2, 3, and 6, and can have a center 207 calculated based at least on a position of the second sensor and locations for the target objects 2, 3, and 6. The group 4 can include the target object 1, and can optionally have a center 209 corresponding to the target object 1. The group 5 can include the target object 4, and can optionally have a center corresponding to the target object 4. In this case, the group 1~group 5 can be used to construct a reversed flight path (see reversed flight path 401' in FIG. 4B) for the unmanned aerial vehicle 201 to perform more precise scouting with fewer scouting stops.

Figure 3B:
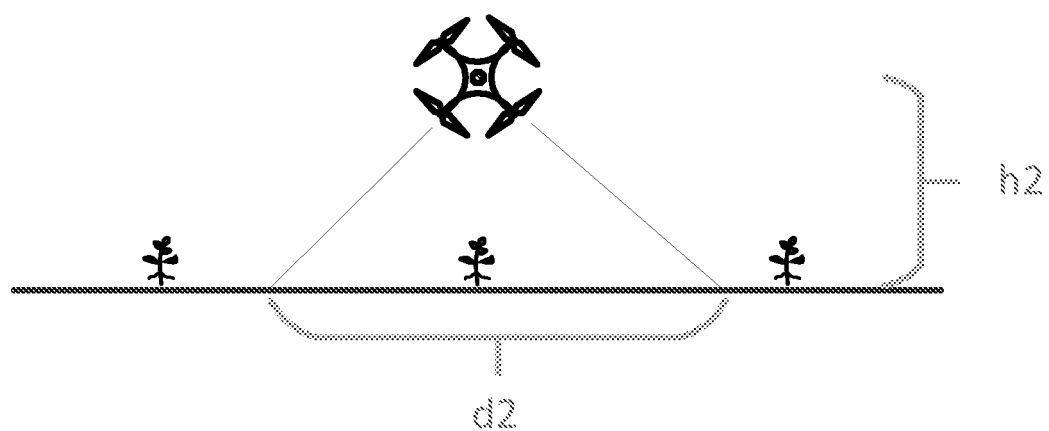
FIG. 3B illustrates a front view of the field showing a second height at which the unmanned aerial vehicle in FIG. 3A flies along the reversed flight path, for practicing certain aspects of the present disclosure, in accordance with various implementations.
Figure 3C:
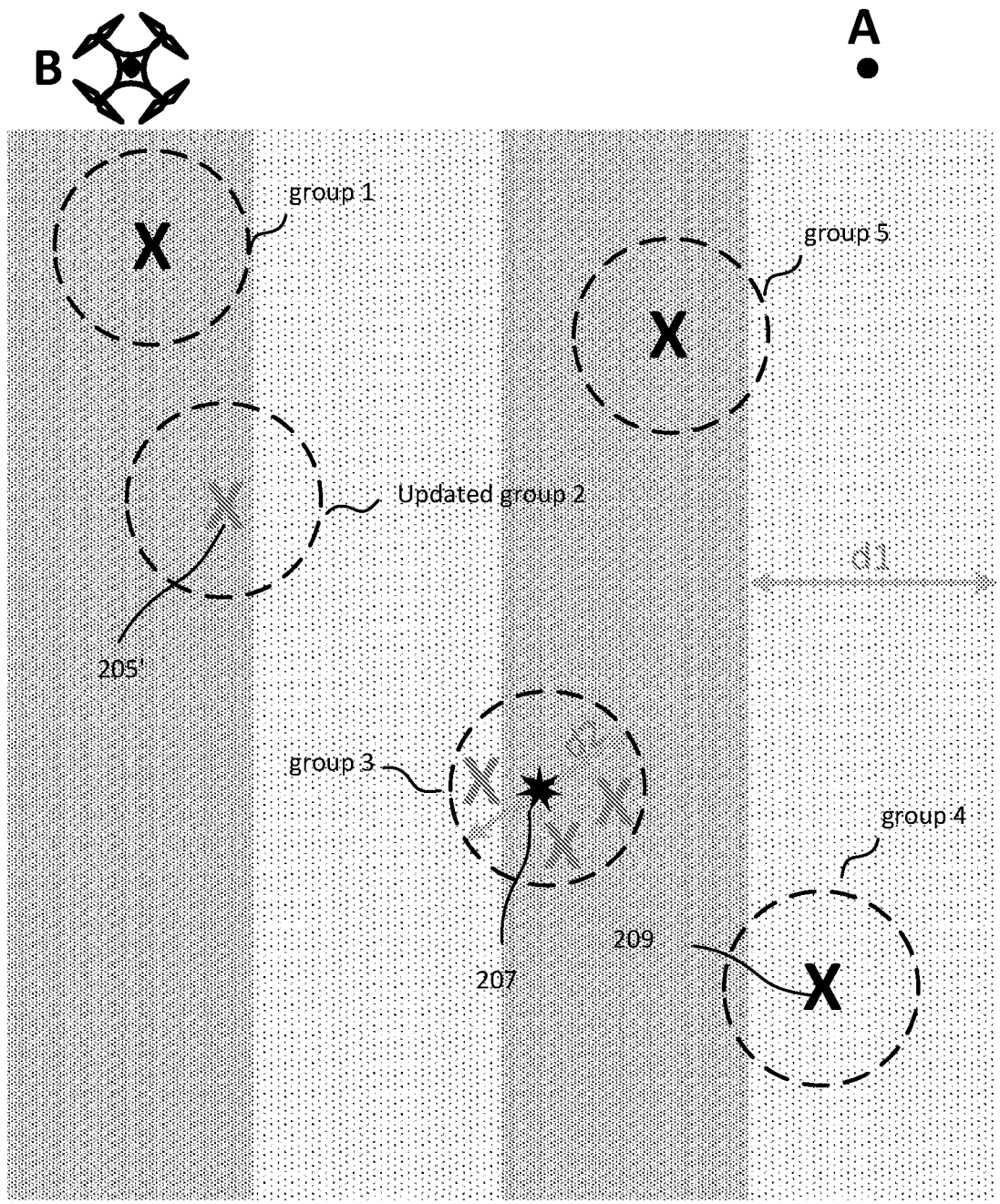
FIG. 3C illustrates an alternative example approach for clustering target object(s) or target region(s) detected in FIG. 2E before the unmanned aerial vehicle starts a reversed flight path from point B, for practicing certain aspects of the present disclosure, in accordance with various implementations.

FIG. 3C illustrates an alternative example approach for clustering target object(s) or target region(s) detected in FIG. 2E before the unmanned aerial vehicle starts a reversed flight path from point B, for practicing certain aspects of the present disclosure, in accordance with various implementations. In some embodiments, optionally, referring to FIG. 3C, before, during, or after clustering, one or more of the target objects 1~8 (e.g., target object 5) can be removed from a respective group (e.g., group 2), when, for instance, a target region of the field 202 covered by the target object 5 (that belongs to group 2) falls below an area threshold or when an accuracy of target object detection for the target object 5 falls below an accuracy threshold. In this case, group 2 can be updated to generate an updated group 2 that has a center 205' corresponding to the target object 7, and the updated group 2 can be applied to configure a reversed flight path (see reversed flight path 401" in FIG. 4C) for the unmanned aerial vehicle 201.

Figure 3D:
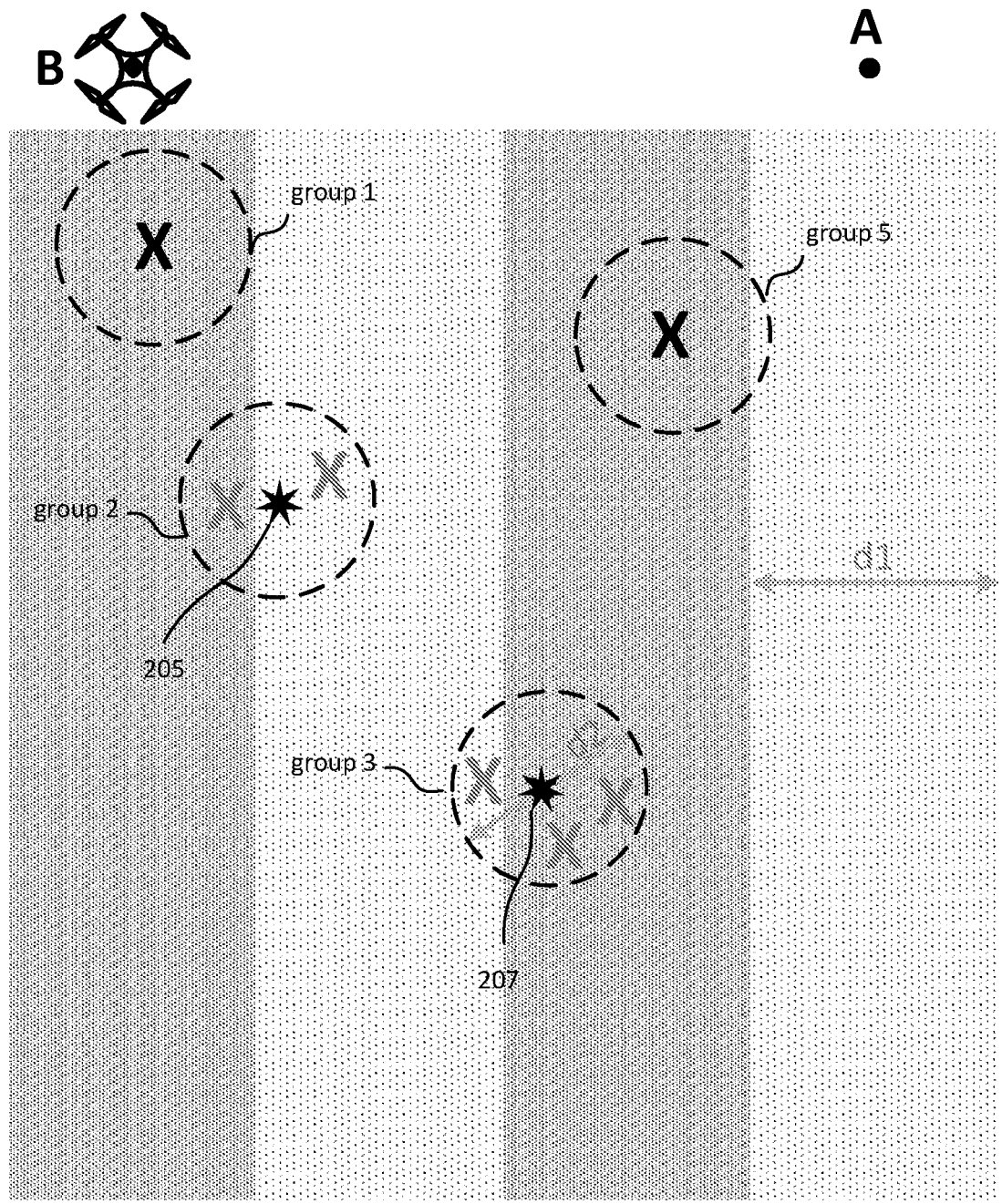
FIG. 3D illustrates an alternative example approach for clustering target object(s) or target region(s) detected in FIG. 2E before the unmanned aerial vehicle starts a reversed flight path from point B, for practicing certain aspects of the present disclosure, in accordance with various implementations.

FIG. 3D illustrates an alternative example approach for clustering target object(s) or target region(s) detected in FIG. 2E before the unmanned aerial vehicle starts a reversed flight path from point B, for practicing certain aspects of the present disclosure, in accordance with various implementations. In some implementations, alternatively or additionally to removing the target object 5 as illustrated in FIG. 3C, referring to FIG. 3D, during clustering, one or more of the target objects 1~8 (e.g., target object 1) can be removed from a respective group (e.g., group 1~group 5), when, for instance, a target region of the field 202 covered by the target object 1 is too remote from the rest of the target objects (e.g., target objects 2~8). In this case, visiting the target object 1 during the reversed flight path may not be supported/allowed by the remaining life of the battery that powers the unmanned aerial vehicle 201, and correspondingly, the group 4 needs to be removed from the groups 1~5. As a result, the groups 1~3 and group 5 can be applied to construct a reversed flight path (see reversed flight path 401''' in FIG. 4D) of the unmanned aerial vehicle 201. A ground robot can, for instance, be configured to visit the target region of the field 202 covered by the target object 1.

In some implementations, in addition to utilizing the unmanned aerial vehicle 201 to perform target images (or other data) that depict target objects (e.g., weeds) within the field 202, the ground robot can be configured to travel along a traveling path (e.g., to which the reversed flight path corresponds) to collect additional or supplemental data that characterizes the target objects. For instance, the ground robot can collect one or more ground images for each spot of the field 202 that corresponds to a respective optimal stop (or intermediate stop) along the reversed flight path 401''' in FIG. 4D (or other reversed flight path).

Figure 4A:
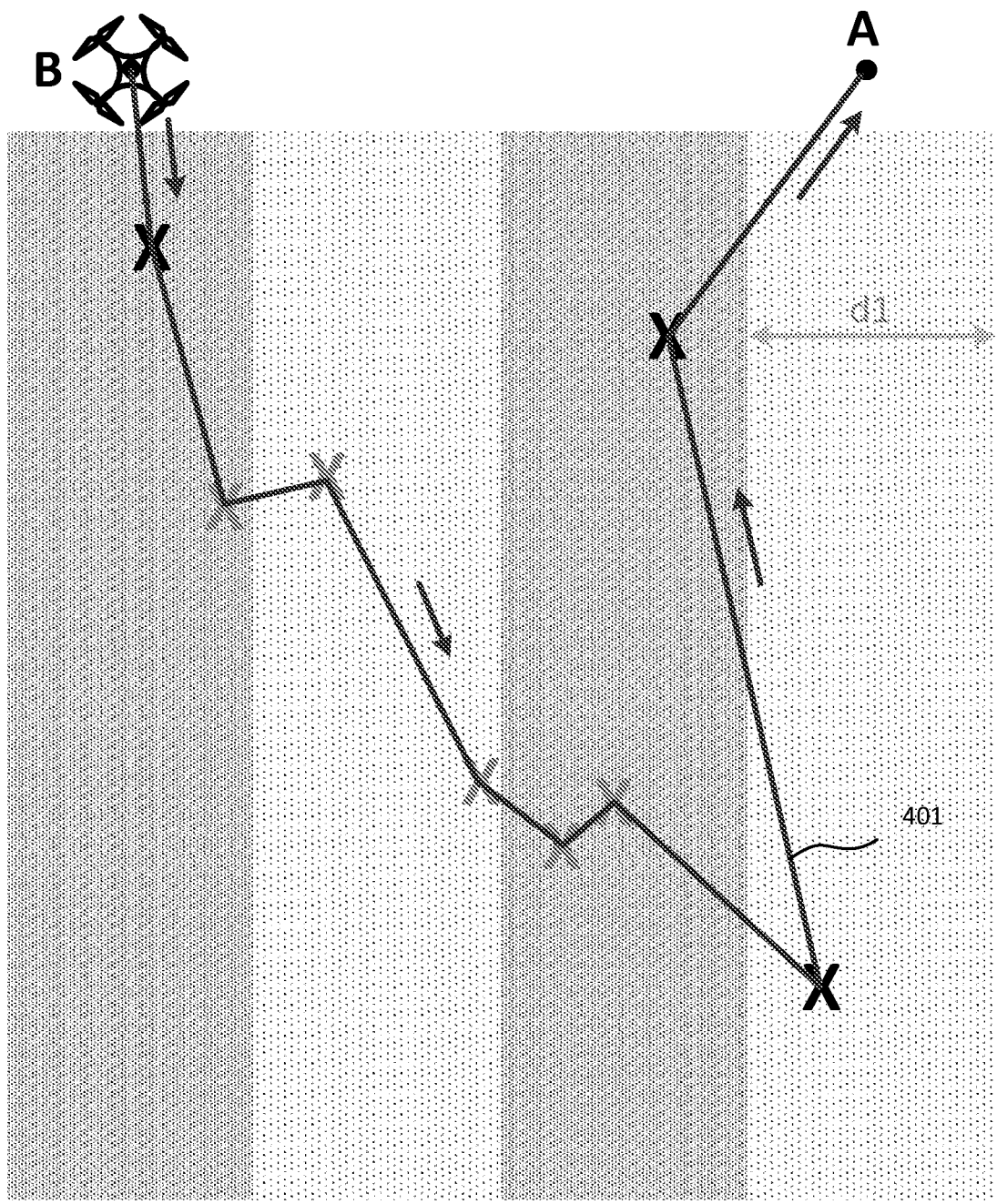
FIG. 4A illustrates an example reversed flight path for the unmanned aerial vehicle, determined based on the clustering in FIG. 3A, for practicing certain aspects of the present disclosure, in accordance with various implementations.

FIG. 4A illustrates a top view of a field showing an example reversed flight path 401 determined from weed locations in FIG. 2E, for practicing certain aspects of the present disclosure, in accordance with various implementations. As shown in FIG. 4A, in some embodiments, after the unmanned aerial vehicle 201 determines the locations for the target objects 1~8, the unmanned aerial vehicle 201 can determine a plurality of intermediate stops forming the reversed flight path 401 based on the locations for the target objects 1~8, before the unmanned aerial vehicle 201 starts the reversed flight path 401. For instance, each of the locations for the target objects 1~8 can correspond to an immediate stop, despite that while each of the locations for the target objects 1~8 is within the field 202, the immediate stop is configured to have a second height h2 (as shown in FIG. 3B).

Figure 4B:
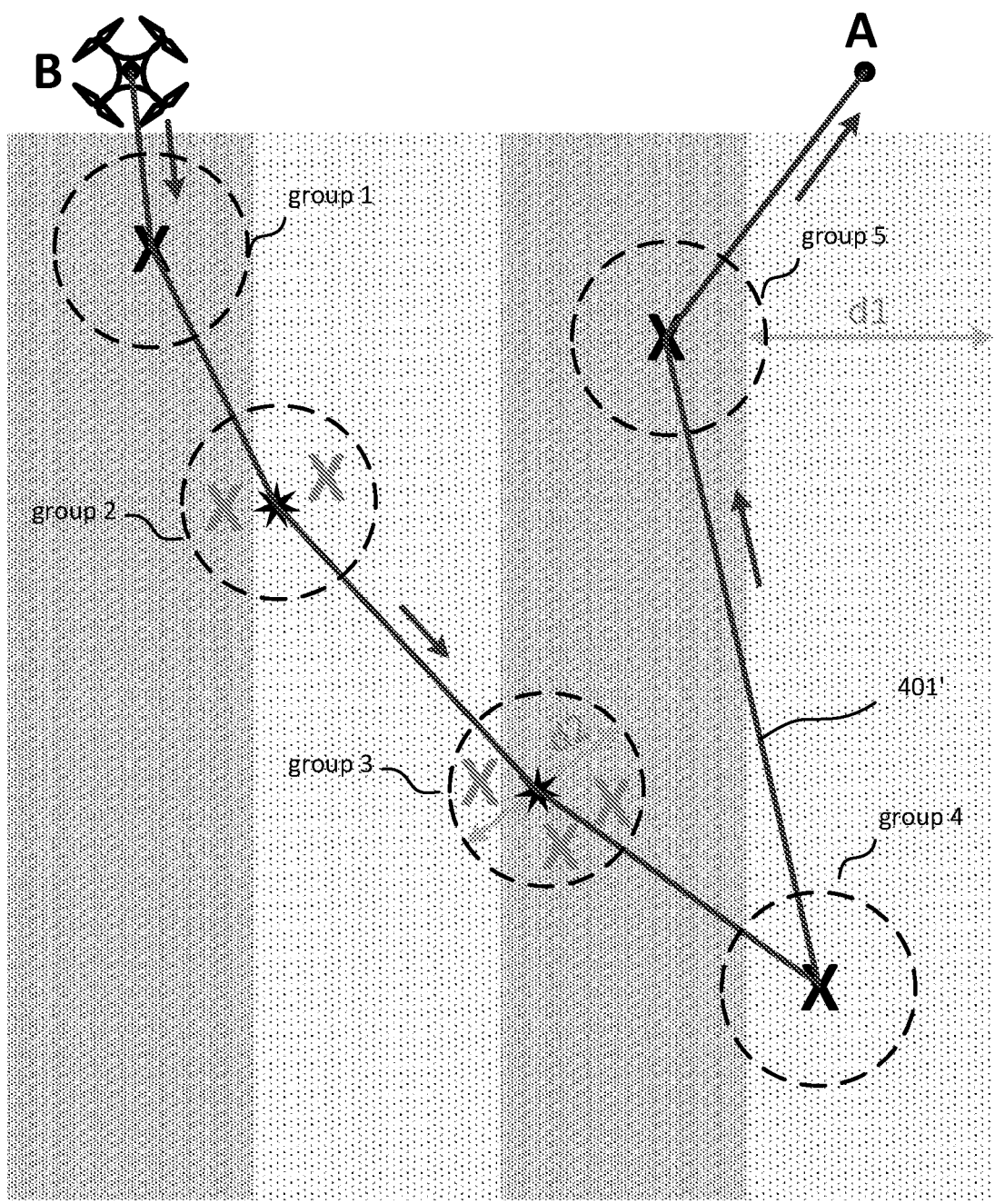
FIG. 4B illustrates another example reversed flight path for the unmanned aerial vehicle, determined based on the clustering in FIG. 3C, for practicing certain aspects of the present disclosure, in accordance with various implementations.
Figure 4C:
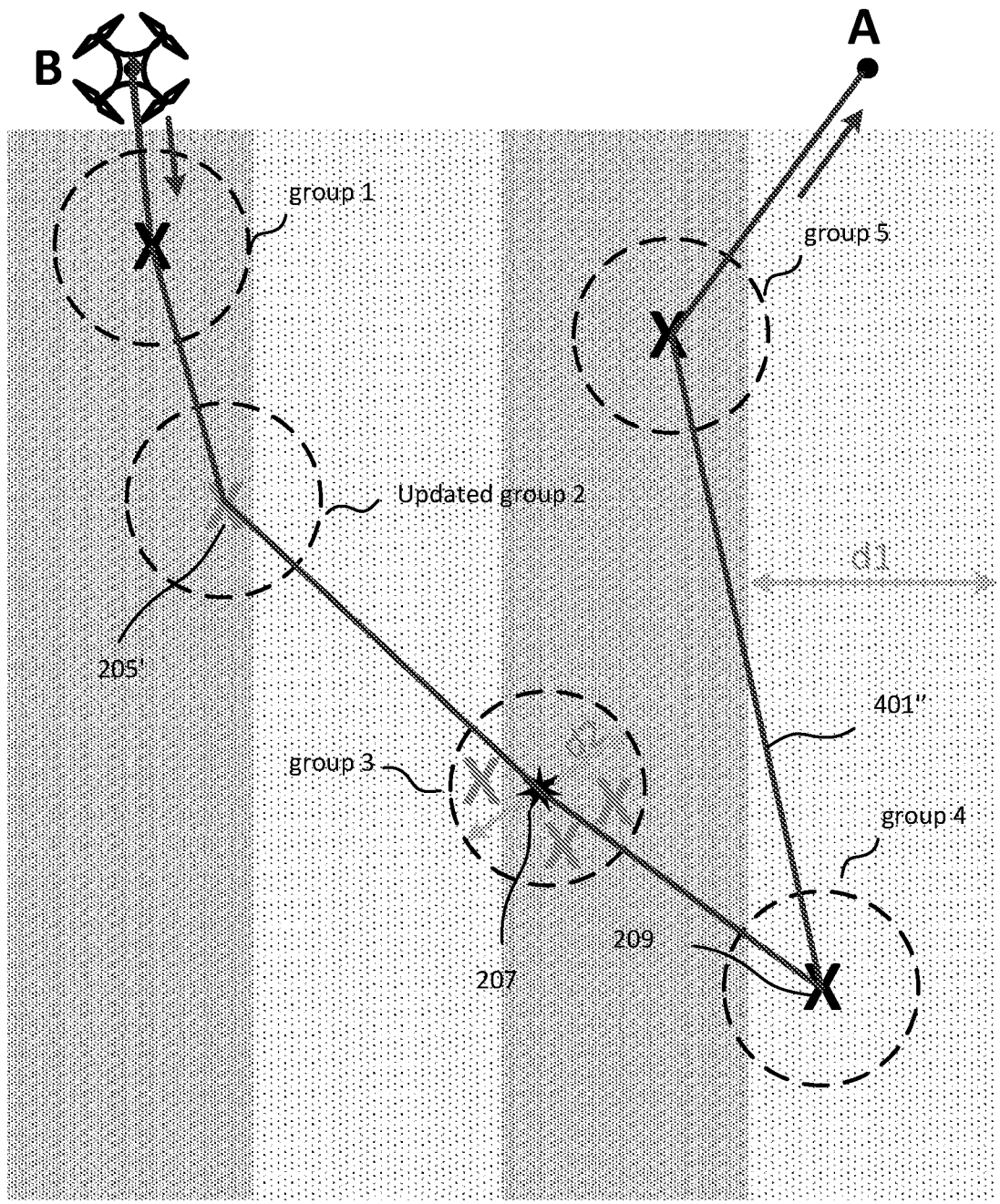
FIG. 4C illustrates a further example reversed flight path for the unmanned aerial vehicle, determined based on the clustering in FIG. 3D, for practicing certain aspects of the present disclosure, in accordance with various implementations.
Figure 4D:
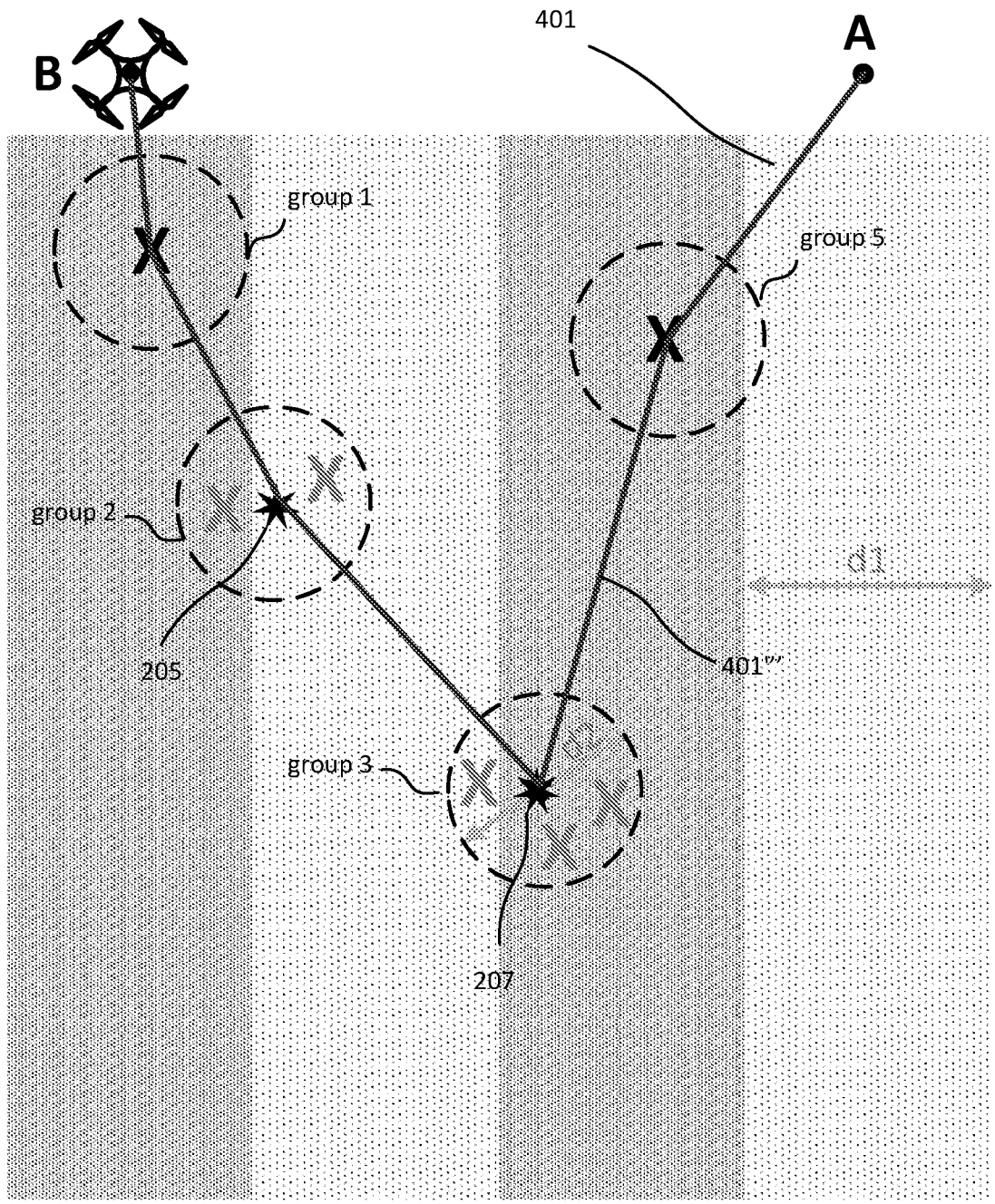
FIG. 4D illustrates a further example reversed flight path for the unmanned aerial vehicle, determined based on the clustering in FIG. 3D, for practicing certain aspects of the present disclosure, in accordance with various implementations.

FIG. 4B illustrates a top view of a field showing an example reversed flight path 401' determined from clustering of target objects/locations in FIG. 3A, for practicing certain aspects of the present disclosure, in accordance with various implementations. FIG. 4C illustrates another example of a reversed flight path (as an alternative to the reversed flight path in FIG. 4A) for the unmanned aerial vehicle, determined based on the clustering in FIG. 3C, for practicing certain aspects of the present disclosure, in accordance with various implementations. FIG. 4D illustrates a further example reversed flight path for the unmanned aerial vehicle, determined based on the clustering in FIG. 3D, for practicing certain aspects of the present disclosure, in accordance with various implementations.

As shown in FIG. 4B, in some embodiments, after the unmanned aerial vehicle 201 determines the locations for the target objects 1~8, the unmanned aerial vehicle 201 can cluster the locations for the target objects 1~8 into groups 1~5, where each center of the groups 1~5 correspond to an optimal stop, for the unmanned aerial vehicle 201 to determine the reversed flight path 401' (as indicated by the arrows in FIG. 4B). The unmanned aerial vehicle 201 can fly along the reversed flight path 401' at the second height h2, and can capture one or more target images (may also be referred to as "target-object-containing images") using the aforementioned one or more image-capturing sensors (and/or additional image-capturing sensors) at each of the optimal stops. Similarly, as shown in FIG. 4C, the unmanned aerial vehicle 201 can fly along the reversed flight path 401" formed by five optimal stops each corresponding to a center of the group 1, updated group 2, group 3, group 4, and group 5, where the unmanned aerial vehicle 201 can capture at least one target image at each of the five optimal stops. Similarly, referring to FIG. 4D, the unmanned aerial vehicle 201 can fly along the reversed flight path 401''' formed by four optimal stops each corresponding to a center of the group 1, group 2, group 3, and group 5, where the unmanned aerial vehicle 201 can capture at least one target image at each of the four optimal stops.

Figure 5A:
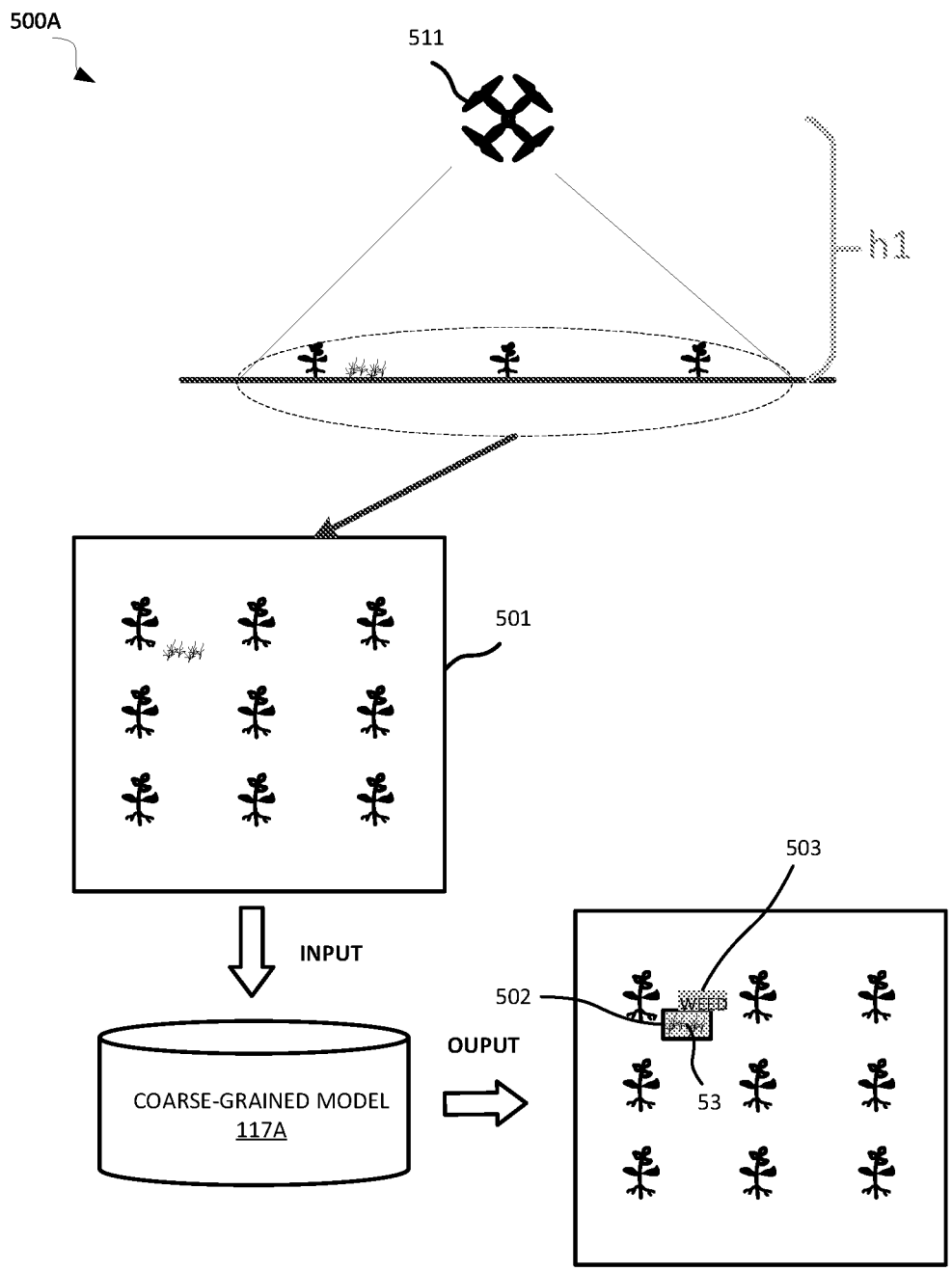
FIG. 5A illustrates detection of a weed location using a first machine learning model (coarse-grained) while an unmanned aerial vehicle is flying along an initial flight path over a field, for practicing certain aspects of the present disclosure, in accordance with various implementations.
Figure 5B:
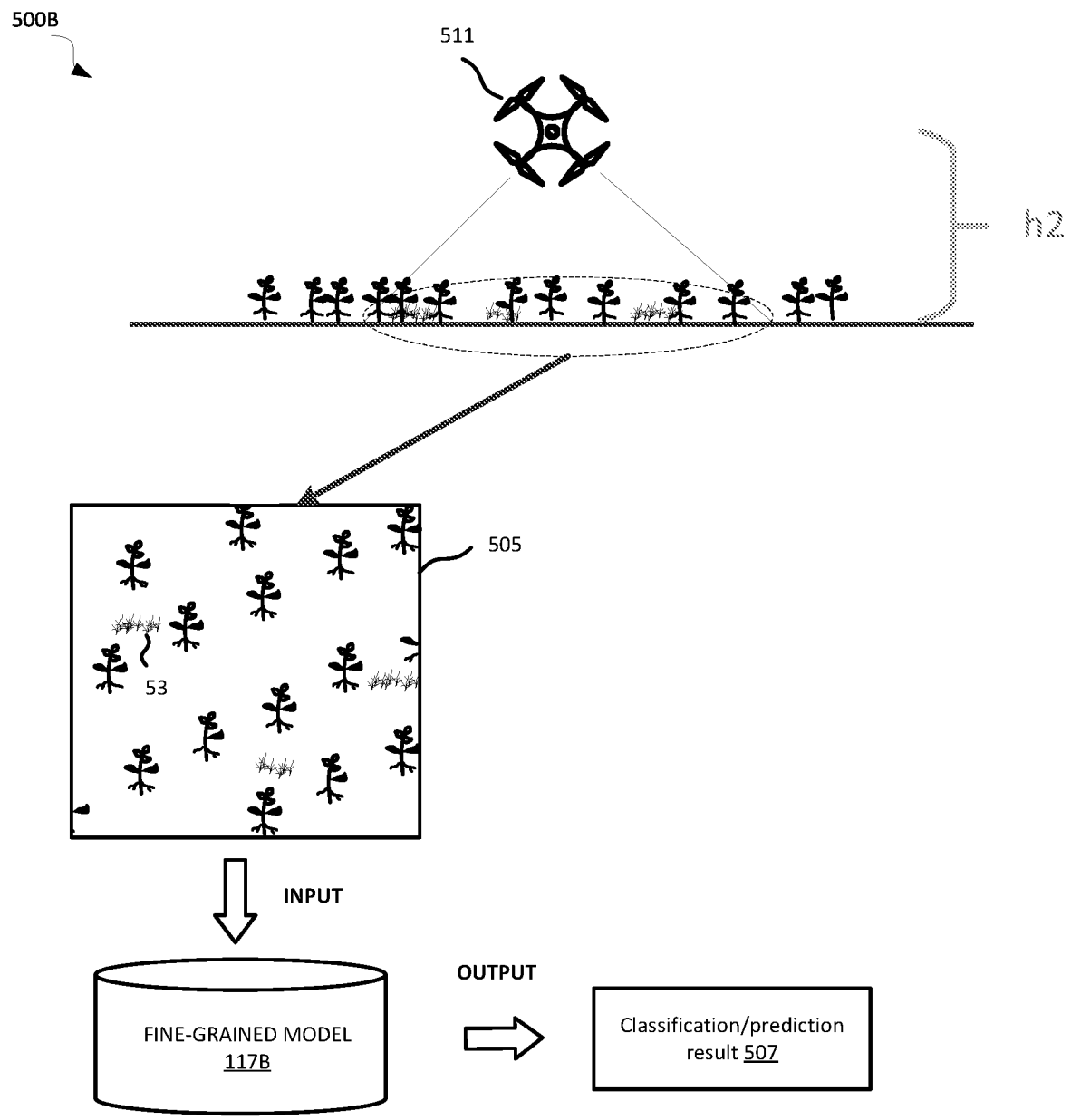
FIG. 5B illustrates processing a target image capturing target object(s) such as weeds, using a second machine learning model (fine-grained), while the unmanned aerial vehicle in FIG. 5A is flying along a reversed flight path over the field, for practicing certain aspects of the present disclosure, in accordance with various implementations.

In various implementations, the one or more target-object-containing images can be processed using a fine-grained machine learning model (117B) as input, to generate an output indicating for instance, a classification/sub-classification or predict result describing or characterizing one or more aspects of the target object(s) within the field 202. For example, FIG. 5A illustrates detection of a weed location using a first machine learning model (coarse-grained 117A) while an unmanned aerial vehicle 511 is flying along an initial flight path over a field, for practicing certain aspects of the present disclosure, in accordance with various implementations. FIG. 5B illustrates processing a target image capturing target object(s) such as weeds, using a second machine learning model (fine-grained), while the unmanned aerial vehicle 511 in FIG. 5B is flying along a reversed flight path over the field, for practicing certain aspects of the present disclosure, in accordance with various implementations.

As shown in FIG. 5A, when flying along the initial flight path at the first height, the unmanned aerial vehicle 511 can, via a first sensor, capture images (including an image 501) at the first frequency. Within a short period of the image 501 being captured by the first sensor, the image 501 can be processed using a coarse-grained machine learning model 117A as input, to generate an output, where the output can include a bounding box 502 generated to define an area (e.g., the aforementioned "target region") of a corresponding target object 53, and/or a label 503 identifying the target object 53 (e.g., name, quantity, occupying area or percentage, etc.).

As shown in FIG. 5B, when flying along the reversed flight path at the first height, the unmanned aerial vehicle 511 can, via a second sensor, capture images (including an image 505) at each of the immediate stops (or each of the optimal stops). The image 505 includes one or more target objects 53, and can be processed using a fine-grained machine learning model 117B as input, to generate an output 507. The output 507 can include a classification result (or a prediction result) that is related to the one or more target objects 5031. After processing each image captured by the second sensor using the fine-grained machine learning model 117B as, autonomous scouting for the field 202 can be considered as being complete, and the processed images can be relied on for analyzing the field 202.

Optionally, to improve the quality of the images captured by the second sensor, the second sensor can have a higher-resolution than the first sensor. Optionally, the unmanned aerial vehicle 50 can fly at the second height (which is lower than the first height) along the reversed flight path.

Figure 6:
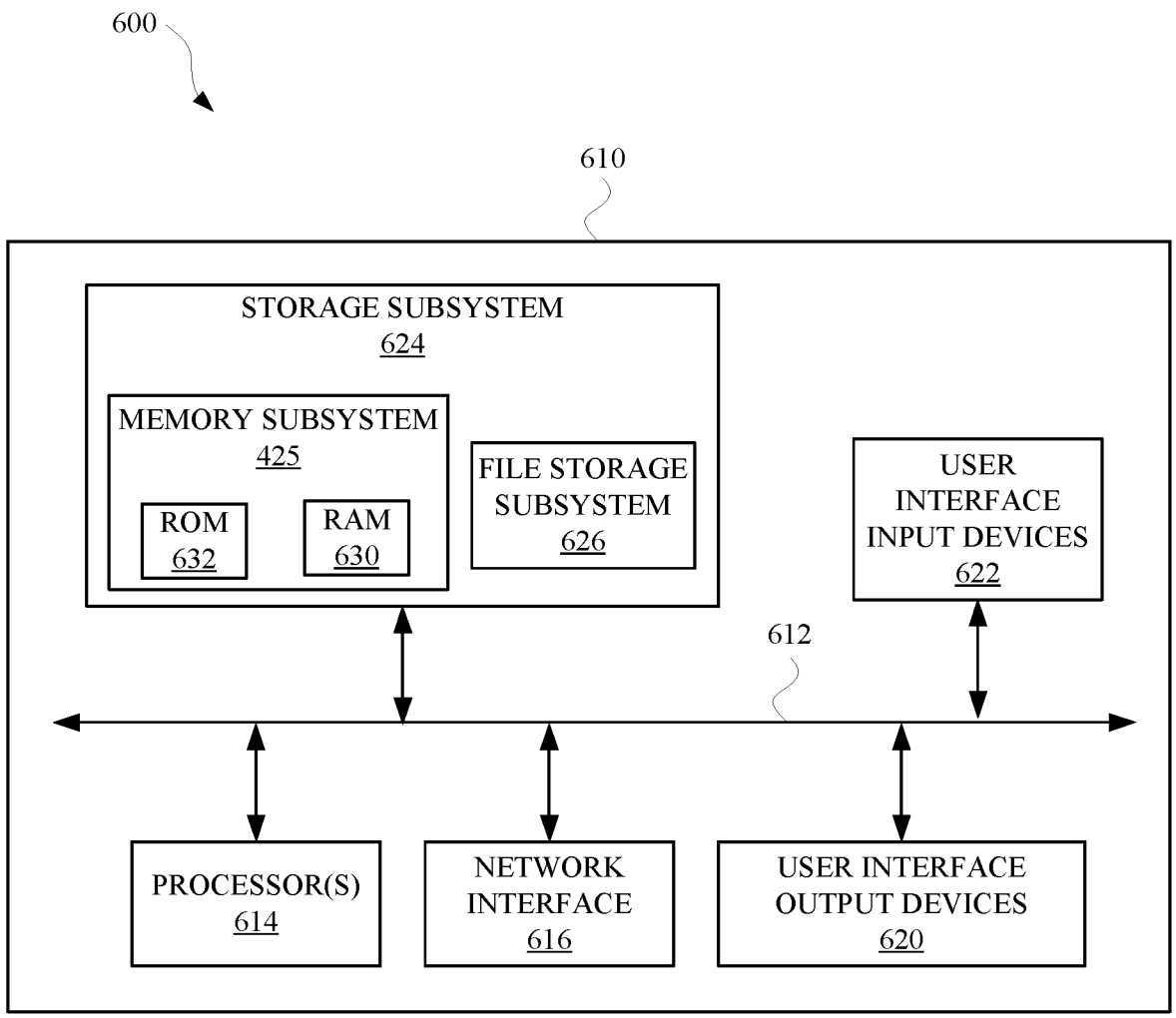
FIG. 6 illustrates an example architecture of a computing system, for practicing certain aspects of the present disclosure, in accordance with various implementations.

FIG. 6 is a block diagram of an example computing device 610 that may optionally be utilized to perform one or more aspects of techniques described herein. In some implementations, one or more of a client computing device, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIG. 1.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

FIG. 7 illustrates an example method of autonomous scouting of a crop field, for practicing certain aspects of the present disclosure, in accordance with various implementations. For convenience, the operations of the method 700 are described with reference to a system that performs the operations. The system of method 700 includes one or more processors and/or other component(s) of a client device and/or of a server device. For instance, the system of method 700 can be, or can include, an unmanned aerial vehicle having: (i) one or more sensors, and (ii) an edge-computing device disposed on the unmanned aerial vehicle, where the edge-computing device includes one or more processors and a memory locally storing coarse-grained and/or fine-grained machine learning models as described previously. Moreover, while operations of the method 700 are shown in a particular order, this is not meant to be limiting. One or more operations may be reordered, omitted, or added.

As shown in FIG. 7, in various implementations, a method 700 of autonomous scouting of the crop field can be performed by a system, where at block 701, the system can determine an initial flight path above the crop field for an unmanned aerial vehicle to fly along.

In various implementations, at block 703, the system can operate the unmanned aerial vehicle to fly at a first height along the initial flight path. When operating the unmanned aerial vehicle to fly at the first height along the initial flight path, the system can, at block 7031, operate a first sensor, of one or more sensors, of the unmanned aerial vehicle, to collect images for the crop field at a first frequency. When operating the unmanned aerial vehicle to fly at the first height along the initial flight path, the system can, at block 7033, for each image of the collected images, process a respective image using a first trained machine learning model in response to the respective image being collected by the first sensor. The first trained machine learning model can process the respective image to generate a respective output that indicates whether a respective target region is detected within the crop field.

In various implementations, at block 705, the system can determine, based on the respective outputs generated by the first trained machine learning models in processing the collected images, one or more target regions (or one or more target objects) within the crop field.

In various implementations, at block 707, the system can determine, based on the one or more target regions, one or more stops of a reversed flight path for the unmanned aerial vehicle to fly along at a second height. Optionally, to determine the one or more stops, the system can cluster the one or more target regions (block 7071), where the one or more stops of the reversed flight path can be determined based on the clustering.

Optionally, in various implementations, the system can cluster the one or more target regions by: clustering, based on one or more conditions, the one or more target regions within the crop field into one or more groups each having a clustered point which can also be referred to as a "center" or "central point"; and configuring a respective optimal stop for the reversed flight path, based on a clustered point of a respective clustered group, of the one or more clustered group.

Optionally, the one or more conditions include: for a respective target region of the one or more target regions, an area and a location of the respective target region, distances between the one or more target regions, one or more sensor conditions of a second sensor that the unmanned aerial vehicle utilizes to capture target images during the reversed flight path, and/or a height condition that indicates the second height at which the unmanned aerial vehicle flies along the reversed flight path. Optionally, the one or more sensor conditions include: a pointing angle of the second sensor, and a field of view of the second sensor.

Optionally, to determine the one or more stops, the system can remove a particular target region from the one or more target regions (block 7073), and determine the one or more stops of the reversed flight path further based on the removing and/or the clustering (block 7075). Optionally, the system can remove a particular target region from the one or more target regions when clustering the one or more target regions within the crop field into one or more groups, meaning that block 7073 can be part of block 7071.

Optionally, the system can remove the particular target region form the one or more target regions based on the removing is based on a battery condition indicating a remaining battery life of a battery, that powers the unmanned aerial vehicle, at an ending point of the initial flight path.

In various implementations, at block 709, the system can further operate the unmanned aerial vehicle to fly along the reversed flight path at the second height, where the second height is lower than the first height. Optionally, when operating the unmanned aerial vehicle to fly along the reversed flight path, the system can operate a second sensor, of the one or more sensors, of the unmanned aerial vehicle, to collect a target image for the crop field at each of the one or more stops. Optionally, the second sensor can have a higher resolution than the first sensor, or the second sensor can have a different field of view than the first sensor. Optionally, the second height is determined based on a resolution, as well as a field of view, of the second sensor.

Optionally, in various implementations, a memory of the system (e.g., a memory of the unmanned aerial vehicle) can locally store a second trained machine learning model. In this case, when operating the unmanned aerial vehicle to fly along the reversed flight path, the system can, for each target image collected by the second sensor, process a respective target image using the second trained machine learning model. The second trained machine learning model, for instance, can be a fine-grained machine learning model, while the first trained machine learning model can be a coarse-grained machine learning model. This is to use the coarse-grained machine learning model which processes image(s) relatively fast (when compared to fine-grained machine learning model) to identify/select images capturing target object(s) such as weeds or other anomaly, and to use the fine-grained machine learning model that has stronger processing capabilities (when compared to the coarse-grained machine learning model) but potentially slower processing speed, to process the selected images.

Optionally, in various implementations, the initial flight path includes a starting point and an ending point, and the one or more stops of the reversed flight path are determined prior to the unmanned aerial vehicle reaching the ending point. Optionally, the unmanned aerial vehicle starts the reversed flight path from the ending point by lowering, at the ending point, from the first height to the second height.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of autonomous scouting, the method comprising:
    determining an initial flight path above a crop field for an unmanned aerial vehicle to fly along, wherein the unmanned aerial vehicle includes (i) one or more sensors, and (ii) an edge-computing device having one or more processors and a memory locally storing at least a first trained machine learning model; and
    operating the unmanned aerial vehicle to fly at a first height along the initial flight path, wherein operating the unmanned aerial vehicle to fly at the first height along the initial flight path includes:
        operating a first sensor of the one or more sensors of the unmanned aerial vehicle to collect images for the crop field at a first frequency;
        for each image of the collected images, processing a respective image using the first trained machine learning model in response to the respective image being collected by the first sensor, wherein the first trained machine learning model processes the respective image to generate a respective output that indicates whether a respective target region is detected within the crop field;
        determining, based on the respective outputs generated by the first trained machine learning model in processing the collected images, one or more target regions within the crop field; and
        determining, based on the one or more target regions, one or more stops of a reversed flight path for the unmanned aerial vehicle to fly along at a second height, wherein determining the one or more stops includes:
            clustering the one or more target regions; and
            determining the one or more stops of the reversed flight path based on the clustering.

2. The method of claim 1, further including operating the unmanned aerial vehicle to fly along the reversed flight path at the second height, wherein the second height is lower than the first height.

3. The method of claim 2, wherein operating the unmanned aerial vehicle to fly along the reversed flight path includes operating a second sensor of the one or more sensors of the unmanned aerial vehicle to collect a target image for the crop field at each of the one or more stops,
    wherein the second sensor has a resolution higher than the first sensor or has a field of view different than the first sensor, and
    wherein the second height is determined based on the resolution of the second sensor and the field of view of the second sensor.

4. The method of claim 3, wherein the memory locally stores a second trained machine learning model, and operating the unmanned aerial vehicle to fly along the reversed flight path further includes, for each target image collected by the second sensor, processing a respective target image using the second trained machine learning model, wherein the second trained machine learning model is a fine-grained machine learning model, and the first trained machine learning model is a coarse-grained machine learning model.

5. The method of claim 1, wherein the initial flight path includes a starting point and an ending point, and the one or more stops of the reversed flight path are determined prior to the unmanned aerial vehicle reaching the ending point.

6. The method of claim 5, wherein the unmanned aerial vehicle starts the reversed flight path from the ending point by lowering, at the ending point, from the first height to the second height.

7. The method of claim 1, wherein clustering the one or more target regions includes
    clustering, based on one or more conditions, the one or more target regions within the crop field into one or more groups each having a clustered point; and
    configuring a respective optimal stop for the reversed flight path based on the clustered point of a respective clustered group of the one or more groups.

8. The method of claim 7, wherein the one or more conditions include:
    for a respective target region of the one or more target regions, an area and a location of the respective target region;
    distances between the one or more target regions;
    one or more sensor conditions of a second sensor that the unmanned aerial vehicle utilizes to capture target images during the reversed flight path; and/or
    a height condition that indicates the second height at which the unmanned aerial vehicle flies along the reversed flight path.

9. The method of claim 8, wherein the one or more sensor conditions include a pointing angle of the second sensor, and a field of view of the second sensor.

10. The method of claim 1, wherein determining the one or more stops further includes:
    removing a particular target region from the one or more target regions; and
    determining the one or more stops of the reversed flight path further based on the removing.

11. The method of claim 10, wherein the removing is based on
    a battery condition indicating a remaining battery life of a battery that powers the unmanned aerial vehicle at an ending point of the initial flight path.

12. A system of autonomous scouting, the system comprising:
    an unmanned aerial vehicle having one or more sensors; and
    an edge-computing device coupled to the unmanned aerial vehicle, the edge-computing device including one or more processors and memories locally storing (i) at least a first trained machine learning model and (ii)

instructions that, when executed, cause the one or more processors to perform operations of:
determining an initial flight path above a crop field for the unmanned aerial vehicle to fly along; and
operating the unmanned aerial vehicle to fly at a first height along the initial flight path, wherein operating the unmanned aerial vehicle to fly at the first height along the initial flight path includes:
  operating a first sensor of the one or more sensors of the unmanned aerial vehicle to collect images for the crop field at a first frequency;
  for each image of the collected images, processing a respective image using the first trained machine learning model in response to the respective image being collected by the first sensor, wherein the first trained machine learning model processes the respective image to generate a respective output that indicates whether a respective target region is detected within the crop field;
  determining, based on the respective outputs generated by the first trained machine learning model in processing the collected images, one or more target regions within the crop field; and
  determining, based on the one or more target regions, one or more stops of a reversed flight path for the unmanned aerial vehicle to fly along at a second height, wherein determining the one or more stops includes:
    clustering the one or more target regions; and
    determining the one or more stops of the reversed flight path based on the clustering.

13. The system of claim 12, wherein the one or more processors are further configured to perform operations of operating the unmanned aerial vehicle to fly along the reversed flight path at the second height, wherein the second height is lower than the first height.

14. The system of claim 13, wherein the one or more processors operates the unmanned aerial vehicle to fly along the reversed flight path by operating a second sensor of the one or more sensors of the unmanned aerial vehicle to collect a target image for the crop field at each of the one or more stops,
  wherein the second sensor has a higher resolution than the first sensor or has a different field of view than the first sensor, and
  wherein the second height is determined based on a resolution and a field of view of the second sensor.

15. The system of claim 14, wherein the memories locally store a second trained machine learning model, and operating the unmanned aerial vehicle to fly along the reversed flight path further includes, for each target image collected by the second sensor, processing a respective target image using the second trained machine learning model, wherein the second trained machine learning model is a fine-grained machine learning model, and the first trained machine learning model is a coarse-grained machine learning model.

16. The system of claim 12, wherein the initial flight path includes a starting point and an ending point, and the one or more stops of the reversed flight path are determined prior to the unmanned aerial vehicle reaching the ending point.

17. The system of claim 12, wherein the one or more processors cluster the one or more target regions by:
  clustering, based on one or more conditions, the one or more target regions within the crop field into one or more groups each having a clustered point; and
  configuring a respective optimal stop for the reversed flight path based on the clustered point of a respective clustered group of the one or more groups.

18. The system of claim 17, wherein the one or more conditions include:
  for a respective target region of the one or more target regions, an area and a location of the respective target region;
  distances between the one or more target regions;
  one or more sensor conditions of a second sensor that the unmanned aerial vehicle utilizes to capture target images during the reversed flight path; and/or
  a height condition that indicates the second height at which the unmanned aerial vehicle flies along the reversed flight path.

19. The system of claim 18, wherein the one or more sensor conditions include a pointing angle of the second sensor, and a field of view of the second sensor.

20. At least one non-transitory computer-readable medium comprising instructions that, when executed by one or more processors, cause the one or more processors to:
determine an initial flight path above a crop field for an unmanned aerial vehicle to fly along, wherein the unmanned aerial vehicle includes (i) one or more sensors, and (ii) an edge-computing device having one or more processors and a memory locally storing at least a first trained machine learning model; and
operate the unmanned aerial vehicle to fly at a first height along the initial flight path, wherein the instructions to operate the unmanned aerial vehicle to fly at the first height along the initial flight path include instructions to:
  operate a first sensor of the one or more sensors of the unmanned aerial vehicle to collect images for the crop field at a first frequency;
  for each image of the collected images, process a respective image using the first trained machine learning model in response to the respective image being collected by the first sensor, wherein the first trained machine learning model processes the respective image to generate a respective output that indicates whether a respective target region is detected within the crop field;
  determine, based on the respective outputs generated by the first trained machine learning model in processing the collected images, one or more target regions within the crop field; and
  determine, based on the one or more target regions, one or more stops of a reversed flight path for the unmanned aerial vehicle to fly along at a second height, wherein the instructions to determine the one or more stops include instructions to:
    cluster the one or more target regions; and
    determine the one or more stops of the reversed flight path based on the clustering.

* * * * *

UNITED STATES PATENT AND TRADEMARK OFFICE
CERTIFICATE OF CORRECTION

PATENT NO. : 12,169,413 B2
APPLICATION NO. : 18/064079
DATED : December 17, 2024
INVENTOR(S) : Yaroshenko et al.

Page 1 of 1

It is certified that error appears in the above-identified patent and that said Letters Patent is hereby corrected as shown below:

In the Claims

Column 20, Claim 7, Line 27, delete "includes" and insert --includes:--

Signed and Sealed this
Twenty-eighth Day of January, 2025

Coke Morgan Stewart
*Acting Director of the United States Patent and Trademark Office*